United States Patent
Sahraei et al.

(10) Patent No.: US 11,706,071 B2
(45) Date of Patent: Jul. 18, 2023

(54) PEAK REDUCTION TONE ALLOCATION TECHNIQUES

(71) Applicant: QUALCOMM Incorporated, San Diego, CA (US)

(72) Inventors: Saeid Sahraei, San Diego, CA (US); Krishna Kiran Mukkavilli, San Diego, CA (US); Gokul Sridharan, Sunnyvale, CA (US); June Namgoong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/319,014

(22) Filed: May 12, 2021

(65) Prior Publication Data

US 2021/0359890 A1 Nov. 18, 2021

Related U.S. Application Data

(60) Provisional application No. 63/025,902, filed on May 15, 2020.

(51) Int. Cl.
*H04L 27/26* (2006.01)
*H04B 17/336* (2015.01)
*H04W 24/10* (2009.01)

(52) U.S. Cl.
CPC ....... *H04L 27/2614* (2013.01); *H04B 17/336* (2015.01); *H04W 24/10* (2013.01)

(58) Field of Classification Search
CPC ... H04L 27/2614; H04B 17/336; H04W 24/10
See application file for complete search history.

(56) References Cited

U.S. PATENT DOCUMENTS

| 2005/0100108 A1* | 5/2005 | Yun | H04L 27/2618 375/260 |
| 2006/0078066 A1* | 4/2006 | Yun | H04B 7/0848 375/299 |
| 2007/0242598 A1* | 10/2007 | Kowalski | H04L 27/2618 370/206 |
| 2016/0286435 A1* | 9/2016 | Zhang | H04W 76/00 |

(Continued)

OTHER PUBLICATIONS

Yu P., et al., "An Enhanced TKM-TR Method for PAPR Reduction of OFDM Signals with Peak Regrowth and Peak Residual Reduced," 8th IEEE International Conference on Communication Software and Networks, 2016, pp. 145-148.

*Primary Examiner* — Zhiren Qin
(74) *Attorney, Agent, or Firm* — Procopio, Cory, Hargreaves & Savitch LLP/Qualcomm

(57) ABSTRACT

Aspects presented herein may improve the efficiency and performance of the tone reservation PAPR reduction technique by allocating peak reduction tone based at least in part on a channel condition, such as based on the signal to noise ratio of the channel. In some aspects, a transmitting device measures a signal to noise ratio for a plurality of tones within a frequency resource. The transmitting device selects a location of one or more reserved tones (e.g., peak reduction tones) among one or more tones based at least in part on an SNR for one or more tones. The transmitting device transmits data to a receiving device in a subset of the plurality of tones that does not include the one or more peak reduction tones. Other aspects and features are also disclosed.

35 Claims, 19 Drawing Sheets

(56) References Cited

U.S. PATENT DOCUMENTS

2016/0365997 A1* 12/2016 Park .................... H04L 27/2618
2019/0116578 A1*  4/2019 Tang ....................... H04W 4/20
2020/0084709 A1*  3/2020 Niu ................... H04W 74/0891

* cited by examiner

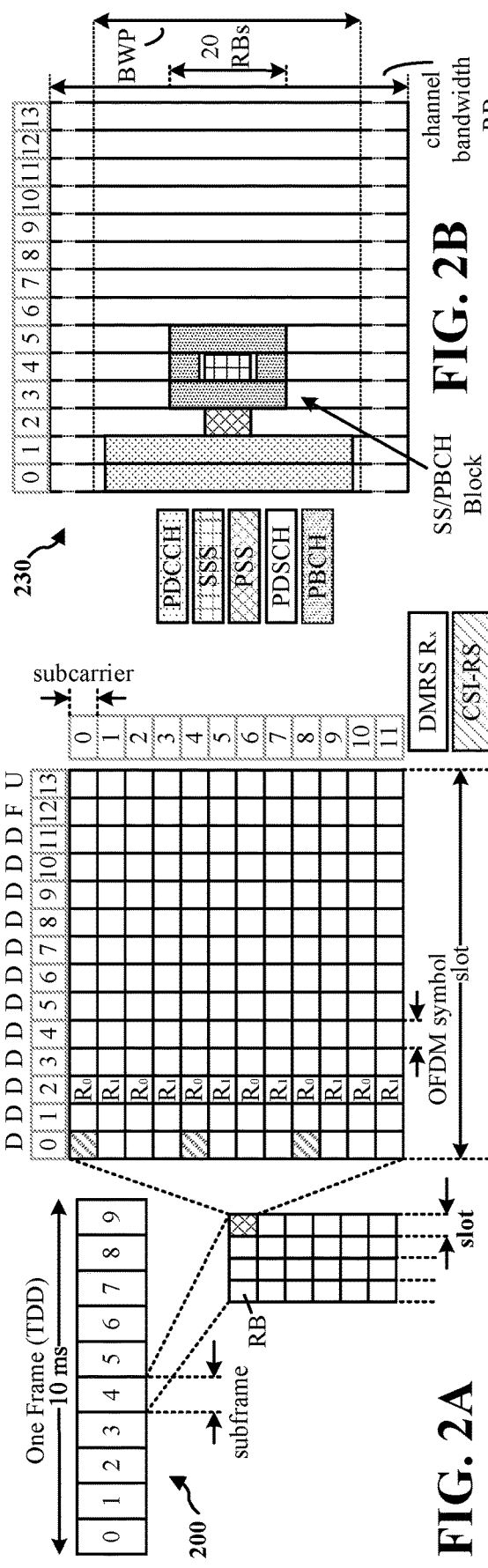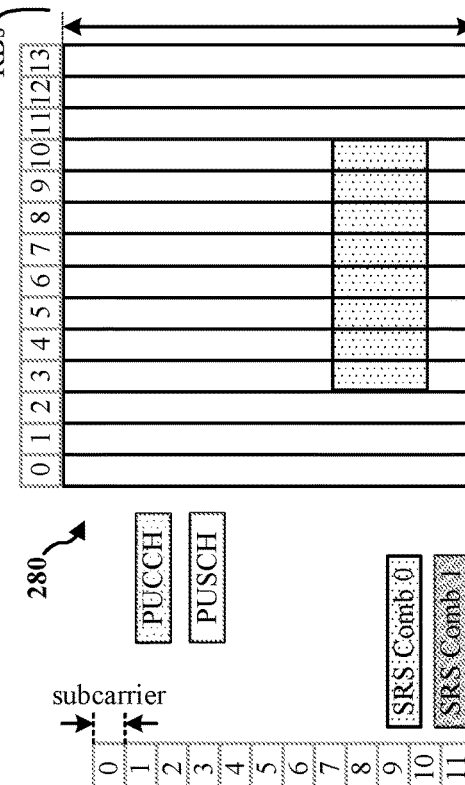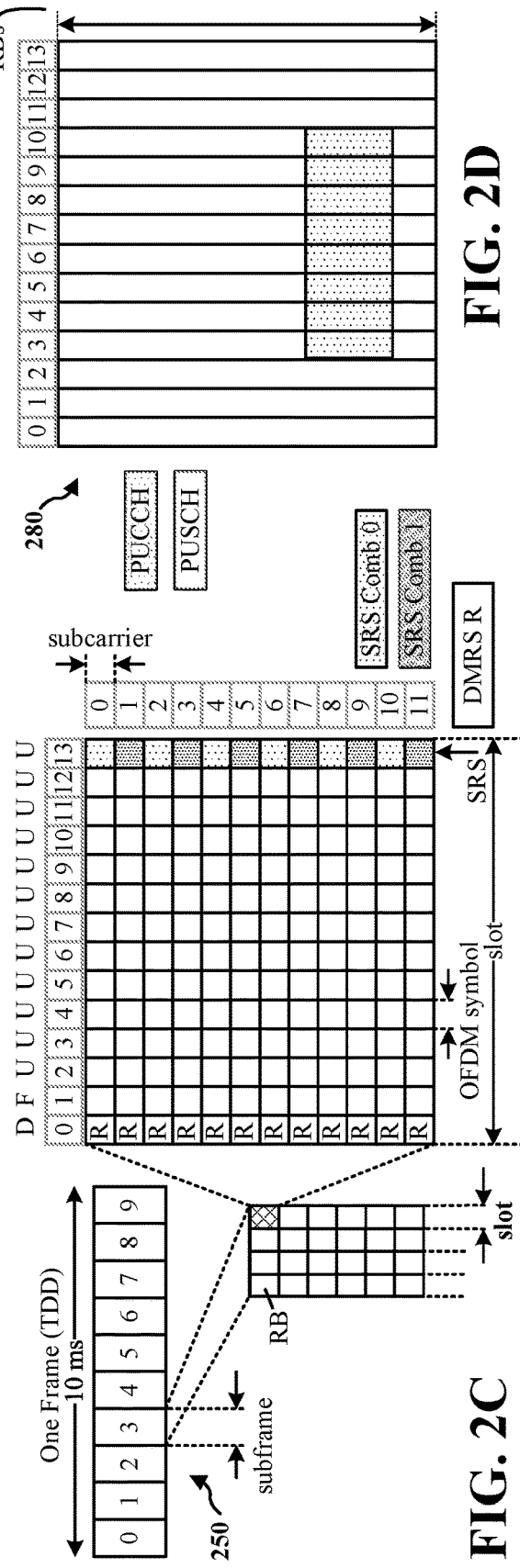
FIG. 2A  FIG. 2B  FIG. 2C  FIG. 2D

US 11,706,071 B2

PEAK REDUCTION TONE ALLOCATION TECHNIQUES

CROSS REFERENCE TO RELATED APPLICATION(S)

This application claims the benefit of U.S. Provisional Application Ser. No. 63/025,902, entitled "PEAK REDUCTION TONE ALLOCATION TECHNIQUES" and filed on May 15, 2020, which is expressly incorporated by reference herein in its entirety.

TECHNICAL FIELD

The present disclosure relates generally to communication systems, and more particularly, to a wireless communication involving a peak reduction tone allocation. Some embodiments enable and provide techniques for managing and/or reducing peak-to-average power ratio (PAPR) to aid in efficient system operations (e.g., non-saturated power amplifier operations) and/or resource usage (e.g., leveraging tone selection for opportunistic transmissions and quality communications).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. In some aspects, the wireless communication may be performed at a transmitting device (e.g., user equipment, network node, or network equipment). The transmitting device may be configured to measure a signal to noise ratio (SNR) for each tone in a plurality of tones. Additionally, or alternatively, the SNR information may be obtained from a buffer or memory. The tones may be located within a frequency resource (e.g., certain frequency allocation or bandwidth). The transmitting device can select a location of one or more reserved tones (e.g., peak reduction tones) among a plurality of tones based at least in part on the SNR of each of the plurality of tones. The selection can be based at least in part on an SNR of for the tones (e.g., a respective SNR for each of the plurality of tones). The transmitting device can transmit data to a receiving device in a subset of the plurality of tones that does not include the one or more reserved tones associated with the selected location.

In an aspect of the disclosure, a method, a computer-readable medium, and an apparatus are provided for wireless communication. In some aspects, the wireless communication may be performed at a receiving device. The receiving device may be configured to receive an indication from a transmitting device indicating a location of one or more reserved tones among a plurality of tones within a frequency resource, where the location is based, at least in part, on an SNR for each of the plurality of tones. Then, the receiving device may receive data in a subset of the plurality of tones that does not include the one or more reserved tones, and the receiving device may ignore the one or more reserved tones.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
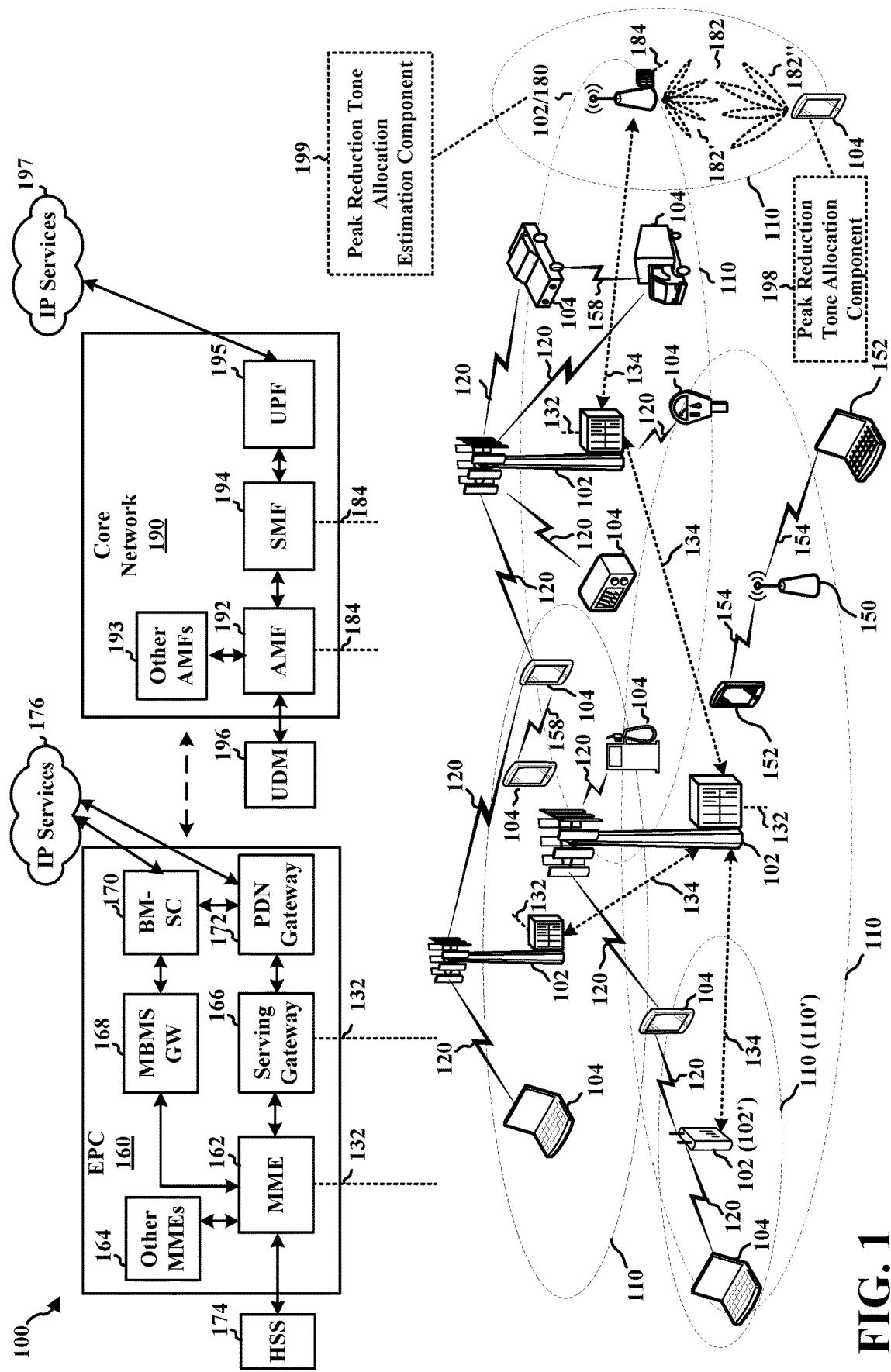
FIG. 1 is a diagram illustrating an example of a wireless communications system and an access network in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the UE 104 may include a peak reduction tone allocation component 198 configured to measure SNR for a plurality of tones within a frequency resource (e.g., resource block(s) within an OFDM symbol). The peak reduction tone allocation component 198 may be configured to select a location of one or more reserved tones among a plurality of tones based at least in part on SNR of each of the plurality of tones. The peak reduction tone allocation component 198 may be configured to transmit data to a receiving device in a subset of the plurality of tones that does not include the one or more reserved tones associated with the selected location. As such, the UE 104 may transmit data to a base station 102 in a subset of the plurality of tones that does not include a peak reduction tone.

In certain aspects, the base station may include a peak reduction tone allocation estimation component 199 configured to estimate or determine the location of one or more peak reduction tones allocated by the UE 104 or the peak reduction tone allocation component 198. In one aspect, the peak reduction tone allocation estimation component 199 may be configured to receive an indication from a transmitting device indicating a location of one or more reserved tones among a plurality of tones within a frequency resource, wherein the location is based, at least in part, on an SNR for each of the plurality of tones. The peak reduction tone allocation estimation component 199 may be configured to receive data in a subset of the plurality of tones that does not include the one or more reserved tones. The peak reduction tone allocation estimation component 199 may be configured to ignore (e.g., actively, passively, or both) the one or more reserved tones. In other words, based on knowing the location of the peak reduction tones, the base station 102 may receive data from the UE 104 in a subset of the plurality of tones and ignore the peak reduction tones.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). The aspects presented herein also apply applies also to a 5G NR frame structure that is TDD.

A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

Although FIGS. 2A-2D illustrate example aspects of an NR frame structure, the aspects of the present disclosure may also be applied for other wireless communication technologies may have a different frame structure and/or different channels.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
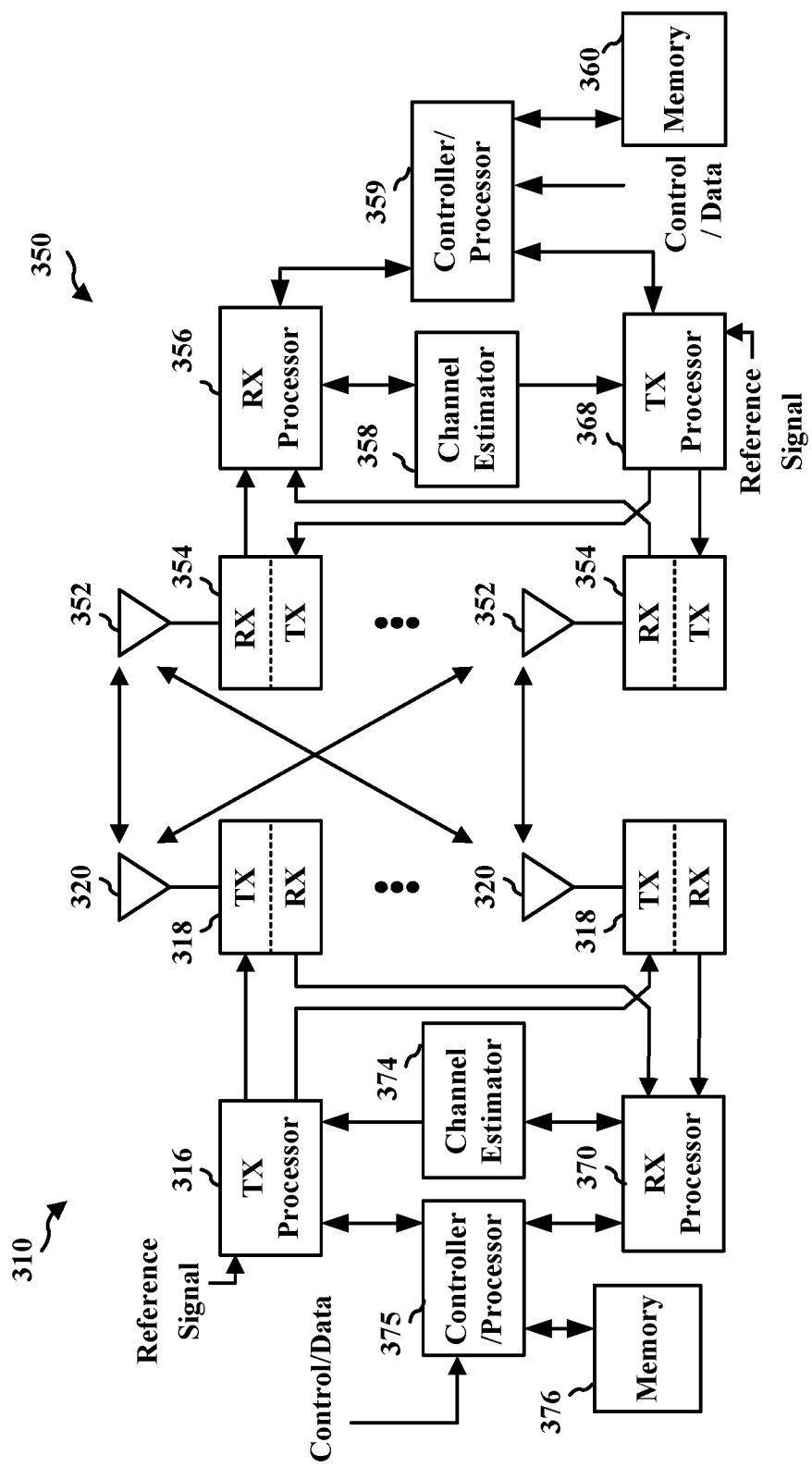
FIG. 3 is a diagram illustrating an example of a base station and user equipment (UE) in an access network in accordance with various aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the peak reduction tone allocation component 198 of FIG. 1.

At least one of the TX processor 316, the RX processor 370, and the controller/processor 375 may be configured to perform aspects in connection with the peak reduction tone allocation estimation component 199 of FIG. 1.

A power amplifier (PA) is a device that may be used to increase the magnitude (e.g., voltage, current, power, etc.) of an input signal. A PA may take in a weak electrical signal or waveform, and then reproduce a similar but stronger waveform at an output by using extra power. The design and implementation of PAs in wireless communications may help signals transmitted by transmitting devices to be strong enough to reach (e.g., to be received by) the receiving devices.

Figure 4:
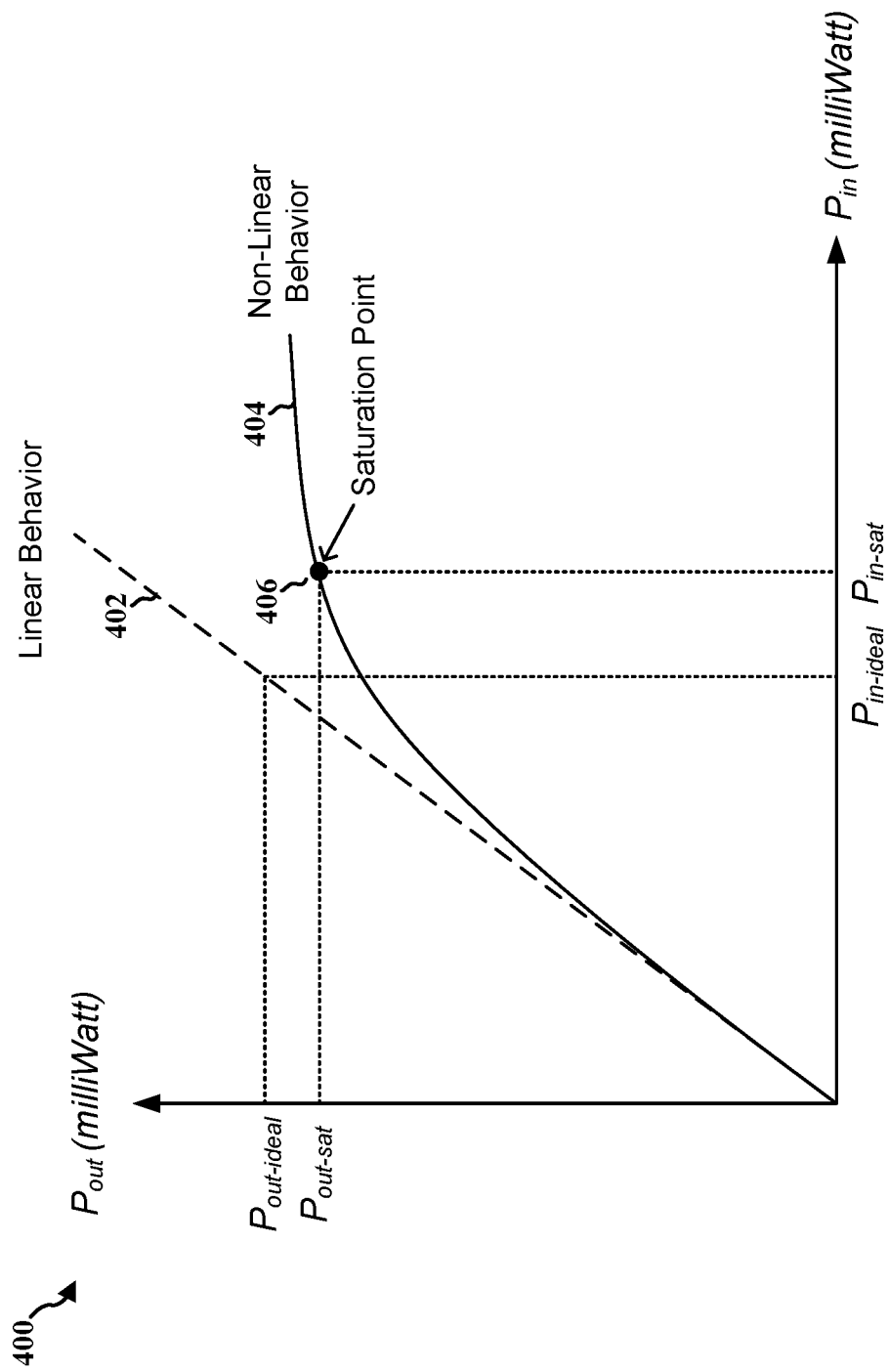
FIG. 4 is a diagram illustrating an example of relationship between an input signal and an output signal of a power amplifier in accordance with various aspects of the present disclosure.

As a PA may consume extra power to magnify an input signal, a goal may be for a PA to have a linear relationship between an input signal and an output signal. FIG. 4 is a diagram 400 illustrating an example relationship between an input signal ($P_{in}$) and an output signal ($P_{out}$) for a PA with a linear behavior and a PA with non-linear behavior. For the PA with linear behavior 402, the output signal (e.g., $P_{out-ideal}$) may be directly proportional to the input signal (e.g., $P_{in-ideal}$). For example, if 10 milliWatt of input signal power corresponds to 15 milliWatt of output signal power, then 20 milliWatt of input signal power may correspond to 30 milliWatt of output signal power, etc.

Figure 5:
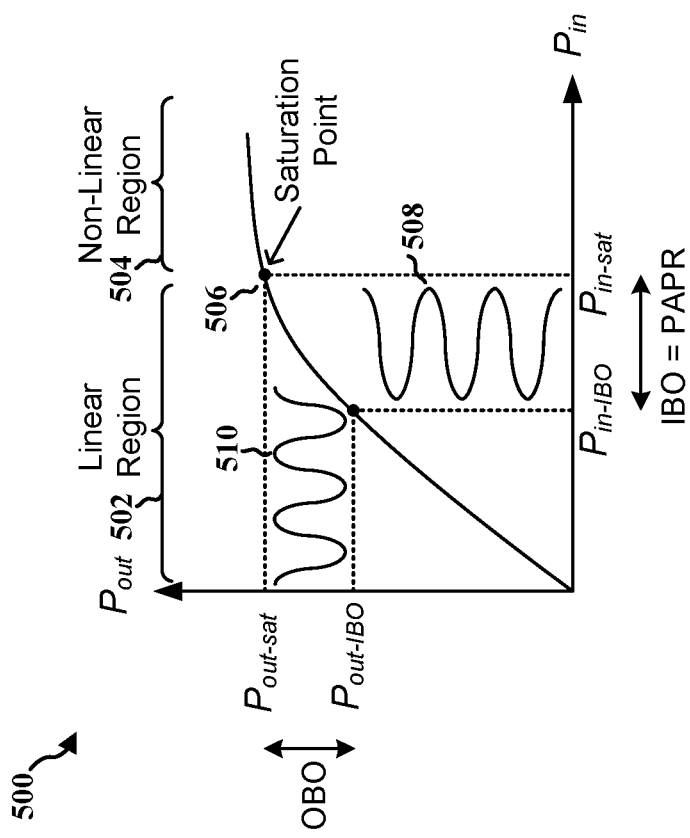
FIG. 5 is a diagram illustrating an example of operating a power amplifier at a mean input power in accordance with various aspects of the present disclosure.

However, PAs may approximately follow the linear behavior for a limited range of input signals (e.g., within the linear region 502 as shown by FIG. 5) and may have non-linear behavior outside the range of the input signals. As the output signal power of the PA may not increase indefinitely due to physical constrains, at some point (e.g., at the saturation point 406), an increase in input signal power for the PA may not produce a discernible increase in the output signal power. Thus, the PA may follow non-linear behavior 404 as shown by FIG. 4, and the non-linear behavior 404 may become particularly noticeable when the PA is operating at higher input signal powers (e.g., at the non-linear region 504 as shown by FIG. 5). For example, when a PA is saturated (e.g., passing the saturation point 406), the PA's output signal may no longer be proportional to the input signal, where a large increase in an input signal power beyond the saturation input signal power (e.g., $P_{in-sat}$) point may yield a relatively small increase in an output signal power from the saturation output signal power (e.g., $P_{out-sat}$) point. As the PA may consume a significant fraction of the power in a communication device, operating the PA beyond the saturation point may waste additional power, and may be an inefficient use of the PA. In addition, the non-linear behavior 404 of the PA may also result in in-band and out-of-band distortion of the signal, and may degrade error vector magnitude (EVM) at the receivers when the input signal power and the output power are not proportional.

To avoid operating a PA beyond the saturation point (e.g., to avoid the drawbacks of the non-linearity at high input power), the PA may be configured to operate at a mean input power that is several dB lower than the saturation point, such that the input signal power may not exceed the saturation input signal power (e.g., $P_{in-sat}$) point. FIG. 5 is a diagram 500 illustrating operating a PA at a mean input power (e.g., $P_{in-IBO}$). For example, for an input signal waveform 508 with a high peak to average power ratio (PAPR), the waveform 508 may be transmitted in the linear region 502 of the PA by decreasing the average power of the input signal (e.g., $P_{in}$). This may be referred to as an "input backoff" (IBO), which may result in a proportional "output backoff" (OBO). A PA may operate most efficiently when the IBO is close or equal to the PAPR of the input signal. For example, if an input signal has a PAPR of X dB, then an IBO of X dB may be applied to the PA to avoid the non-linearity. This enables the input signal to be amplified within the linear region 502 when the waveform 508 of the input signal is at the peak. For example, if the waveform 508 has a PAPR of 10 dB, and the PA also has an IBO equals or close to 10 dB, then the waveform 508 may be amplified within the linear region 502 without crossing the saturation point 506 (e.g., $P_{in-sat}$). This may prevent the output signal waveform 510 from distortion during an amplification, which may happen when the waveform 508 or part of the waveform 508 is amplified at the non-linear region 504.

Figure 6B:
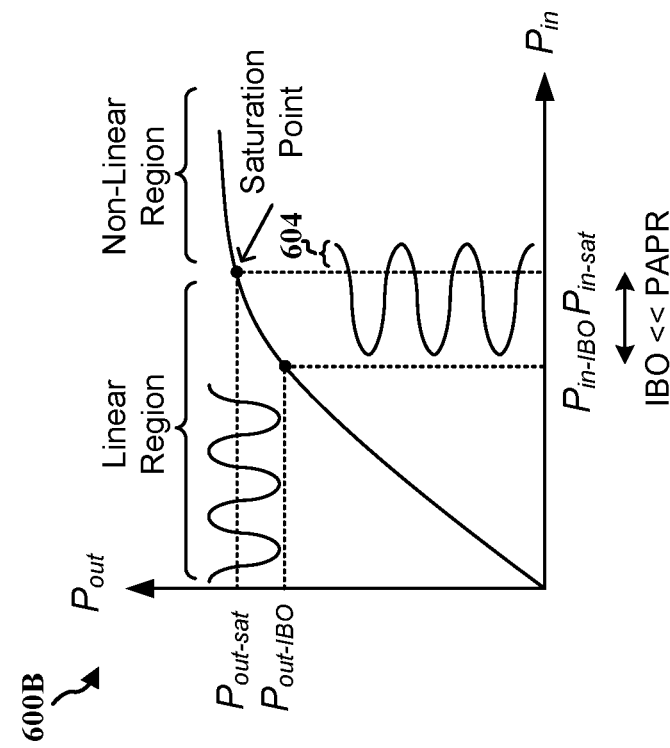
FIGS. 6A and 6B are diagrams illustrating examples of different input backoff setting in accordance with various aspects of the present disclosure
Figure 6A:
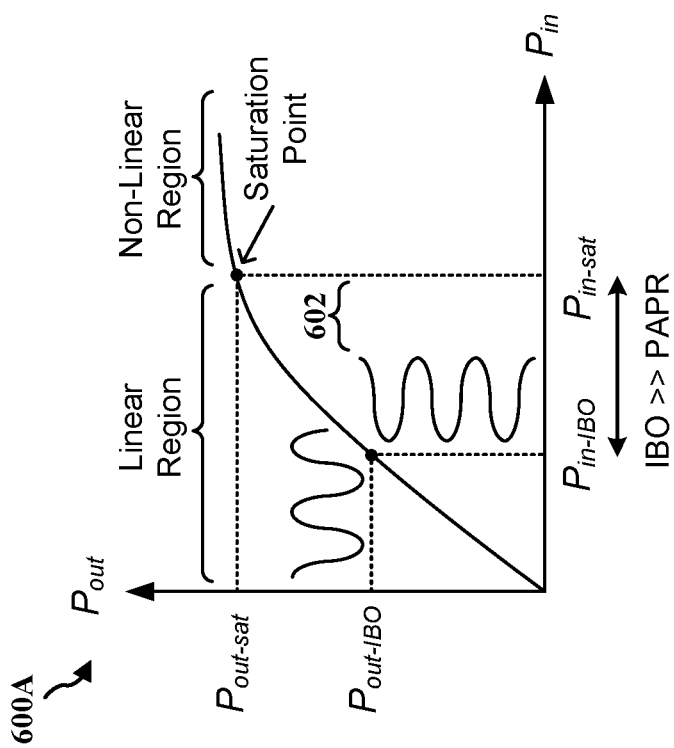

However, if a high IBO is applied to a PA but the input signal does not have a high PAPR (e.g., IBO>>PAPR), such as shown by diagram 600A of FIG. 6A, it may be an inefficient use of the PA as it may reduce the maximum amplification of the PA. For example, a portion 602 of the linear region within the PA may be unused due to the high IBO, particularly the region close to the saturation points where a high input signal (e.g., $P_{in-sat}$ near may be amplified to nearly proportionate high output signal (e.g., near $P_{out-sat}$). This may limit the maximum performance of the PA and reduce a transmission range of a transmitting device. On the other hand, if the IBO applied to a PA is too low and the input signal has a PAPR that exceeds the IBO (e.g., PAPR>>IBO), such as shown by diagram 600B of FIG. 6B, at least a portion (e.g., portion 604) of the input signal may be amplified at the non-linear region of the PA, which may cause the output signal to be distorted and the bit error rate (BER) performance of a transmitting device may be degraded.

While OFDM signals may have tolerance to inter-symbol interference and good spectral efficiency, due to large fluctuations in their signal envelopes, OFDM signals may suffer from significant PAPR that may grow rapidly with the size of the OFDM block. For example, for a network that employs larger OFDM blocks, such as may be employed in 5G NR, the OFDM blocks may have higher PAPR. Due to the high PAPR, a PA designed for a communicating device capable of transmitting larger OFDM block(s) may be configured with a high IBO, which may result in an inefficient use of the PA when the communicating device is not transmitting signals with high PAPR, such as described in connection with FIG. 6A. Therefore, as an alternative or in addition to applying a high IBO to the PA, PAPR reduction techniques may be used to reduce the PAPR of an input signal, such that the IBO applied to a PA may be kept at a lower value to maintain the spectral and energy efficiency of the PA. In addition, by reducing the PAPR, a PA may amplify the signal at a higher input power (e.g., as close to the saturation point as possible and within the linear region) and produce higher output signal.

In some examples, PAPR reduction techniques may be data-dependent and computationally expensive, which may make them unfit for a real-time implementation. For example, when a PAPR reduction mechanism is designed for the front end of a real-time transmission chain (e.g., to be operated on the fly), the PAPR reduction mechanism may have a relatively short time to process the input signal. For example, every time the PAPR reduction mechanism receives an OFDM symbol, it may have less than a millisecond to process the OFDM symbol to reduce the PAPR. For most PAPR techniques, a millisecond may not be enough as a lot of processing may be involved during the PAPR reduction. Clipping and filtering (CF) is one of the PAPR reduction techniques that may be used for real-time implementations, e.g., because of its low complexity and low processing time. However, CF and similar techniques may distort the signals themselves and result in in-band signal distortion, which may not converge to a desirable solution.

Cellular networks that operate in a higher and wider range of frequencies (e.g., 4G LTE, 5G NR, etc.) may have an abundance of bandwidth both in the uplink and downlink. This may include the addition of FR2 as well as the increase in the available bandwidth to 100 MHz in the sub-6 frequencies (i.e., frequencies under 6 GHz). Cellular networks with abundant or excess bandwidth may use longer OFDM symbols (e.g., larger OFDM blocks) for transmissions. While increasing the OFDM symbol size may increase the PAPR of the OFDM symbol as mentioned above, the excess bandwidth may also be used for PAPR reduction. For example, when a transmitting device such as a UE is transmitting in the uplink, there may be multiple free resource blocks available to the transmitting device.

In some techniques described herein, a transmitting device may use a tone reservation approach to reduce PAPR for an OFDM symbol. These techniques can include scenarios where a transmitting device may use unused, otherwise-idle, or reserved tones (e.g., unused or reserved subcarriers) of an OFDM symbol to accommodate a peak-cancelling signal that lowers PAPR of the OFDM symbol. For example, in a sample deployment scenario, the magnitude and the phase of reserved tones may be optimized for a given OFDM symbol to minimize PAPR. Additionally, or alternatively, a transmitting device may reserve some tones in subcarriers of an OFDM symbol, and the reserved tones may be used for PAPR reduction instead of transmitting data.

Tones used for PAPR reduction in reservation techniques may have a variety of features. For example, a tone reserved for PAPR reduction (e.g., tone containing the peak-cancelling signal) may be referred as a peak reduction tone (PRT). Given that, in some scenarios, there may be no overlap between one or more reserved tones and one or more data tones within one or more respective OFDM symbols (e.g., the reserved tones may be orthogonal with the data tones), a tone reservation scheme does not introduce any EVM and/or adjacent channel leakage ratio (ACLR) restrictions. Thus, a receiving device (e.g., a base station receiving the OFDM symbol) may be configured to block, disregard, ignore, and/or bypass signals in the reserved tones and decode signals in data tones. Bypassing and not decoding signals in reserved tones enables and provides improved device signal processing and improves communication throughput. As such, for purposes of the present disclosure, the reserved tones may also be referred to as "non-data tones," which may include PRTs.

Varying tone characteristics can aid in some deployments. As one example, the magnitude and the phase of one or more reserved tones may be adjusted for each OFDM symbol to produce suitable PRTs. And the allocation of PRTs in each OFDM symbol may also be customized for optimized PAPR reduction. Additionally, or alternatively, a number of PRTs for each OFDM symbol may vary depending on the available bandwidth. While the location of PRTs may be determined on a per-OFDM symbol basis, fixing the location of PRTs for OFDM symbols in advance may reduce the complexity of the transmitting device. As the optimization (e.g., allocation) may be performed in advance instead of in real-time, the transmitting device's performance may be significantly improved. In addition, there may be a generally good index allocation for the PRTs within the OFDM symbol.

Figure 7:
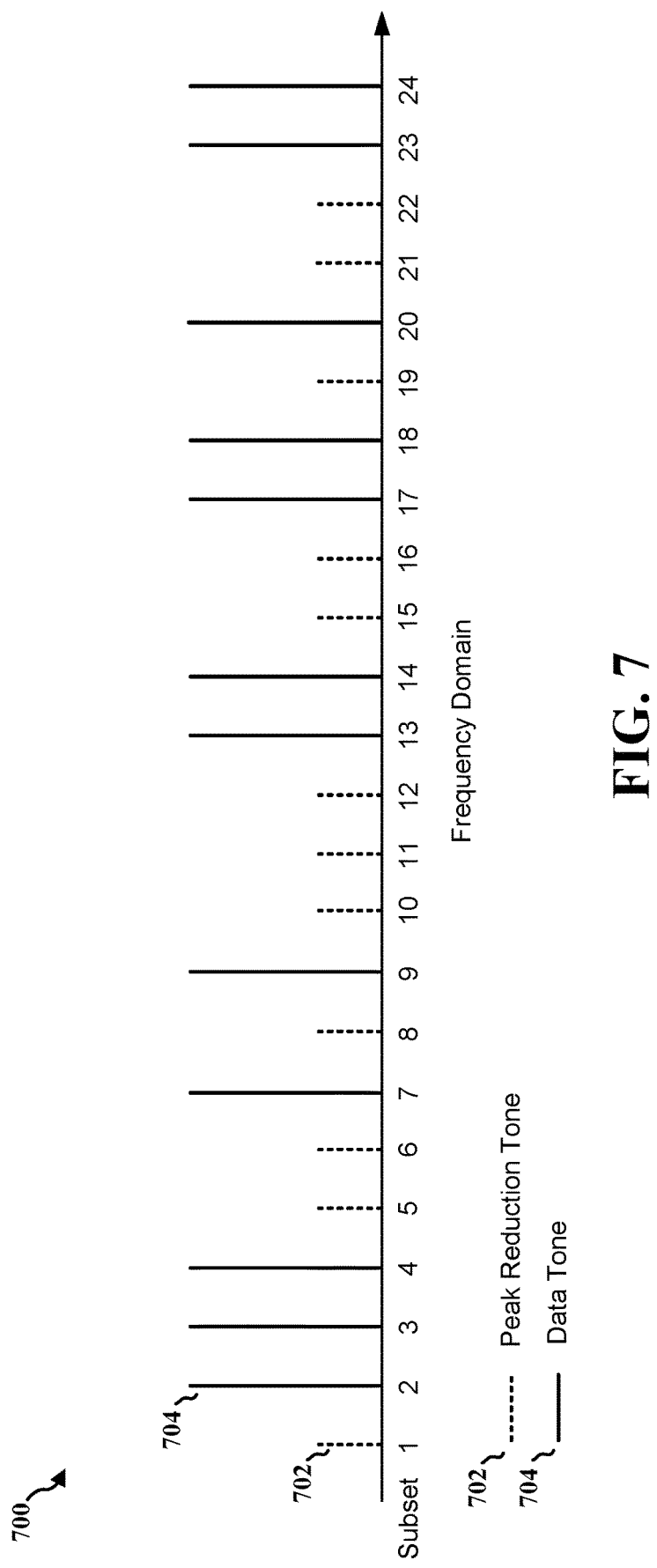
FIG. 7 is a diagram illustrating an example tone distribution showing peak reduction tones and data tones in accordance with various aspects of the present disclosure.

FIG. 7 is a diagram 700 illustrating an example allocation of PRTs (e.g., reserved tones) 702 and data tones 704 (e.g., tone containing data information). The illustration depicts several tones within an OFDM symbol in the frequency domain. As can be seen, PRTs are disposed among data tones such that some data tones flank PRTs. In some aspects, allocation of PRTs 702 in an OFDM symbol enables low PAPR in the time domain. Transmitting devices may obtain the waveform of the OFDM symbol in time domain by taking the Inverse Fast Fourier Transform (IFFT) of the signal in frequency domain. FIG. 7 depicts a sample arrangement of PRTs and data tones and many other PRT/data tone arrangements may also be used given configurable nature of techniques discussed herein.

Indeed, as mentioned previously, transmitting devices may customize the location and the number of PRTs 702 for an OFDM symbol. Adaptive configuration enables flexibility considering communication operations and/or other factors (e.g., such as channel conditions, class/types of data transmission, etc.). For example, suppose a transmitting device (e.g., the UE) is granted two (2) resource blocks that include twenty-four (24) tones for transmission, the transmitting device may use half of the available tones (e.g., twelve (12) tones) as PRTs. The transmitting device may also choose any subset of the 24 available tones as long as the receiving device (e.g., the base station) is made aware of the transmitting device's choice, which may be configured through signaling and/or fixed in advance. For example, the transmitting device may choose subsets 1, 5, 6, 8, 10, 11, 12, 15, 16, 19, 21 and 22 for PRTs, and may inform its choice of subsets to the receiving device via signaling. In some examples, the subsets may be fixed in advance so that the receiving device may know which tones are PRTs without receiving additional signaling from the transmitting device.

If the location of the reserved tones is known by a transmitting device (e.g., a UE, a base station, etc.), the transmitting device may apply a signal to clipping noise ratio-tone reservation (SCR-TR) algorithm to the reserved tones to optimizes their values for PAPR reduction. For example, suppose a transmitting device is granted a total of N tones $\{1, \ldots, N\}$ (e.g., subsets 1-24 of FIG. 7) for transmission. Let $\Phi$ be a subset of $\{1, \ldots, N\}$ corresponding to the PRT locations (e.g., subsets 1, 5, 6, 8, 10-12, 15, 16, 19, 21 and 22 of FIG. 7). The data tones may be allocated to the remaining tones, $\{1, \ldots, N\}\backslash\Phi$ (e.g., subsets 2-4, 7, 9, 13, 14, 17, 18, 20, 23, 24 of FIG. 7). Then, a frequency domain kernel P may be constructed based on:

$$P_i = \begin{cases} 1 & \text{if } i \in \Phi \\ 0 & \text{if } i \in [N]\backslash\Phi \end{cases},$$

where $P_i$ may denote the $i^{th}$ tone of the total granted tones N (e.g., $P_1=1^{st}$ tone, $P_4=4^{th}$ tone, $P_{24}=24^{th}$ tone, etc.). Based on the frequency domain kernel, when the $i^{th}$ tone is a subset of $\Phi$, a value of 1 may be assigned to the $i^{th}$ tone (e.g., subsets 1, 5, 6, 8 . . . of FIG. 7). When the $i^{th}$ tone is not a subset of $\Phi$, a value of 0 may be assigned to the $i^{th}$ tone instead (e.g., subsets 2-4, 7, 9 . . . of FIG. 7). Next, let p denotes P in the time domain, where a time domain kernel p may be obtained by taking the IFFT of P, e.g., p=ifft(P), and let X denotes the frequency-domain data (e.g., data tones). As the value 0 is assigned to the $i^{th}$ tone when the $i^{th}$ tone is not a subset of $\Phi$, naturally, $X_i=0$, if $i \in \Phi$. For example, in FIG. 7, $X_1$ and $X_5$ may be 0 as subsets 1 and 5 are within the subset of $\Phi$, and $X_2$ and $X_7$ may not be 0 as subsets 2 and 7 are not within the subset of $\Phi$, etc. Similarly, let x denotes Xin time domain kernel, where x may be obtained by taking the IFFT of X, e.g., x=ifft(X). If the number of PRTs is sufficiently large and the location of the PRTs are chosen properly, then the time domain kernel p may look like a delta function with negligible side-lobes (shown in FIG. 9).

Figure 8:
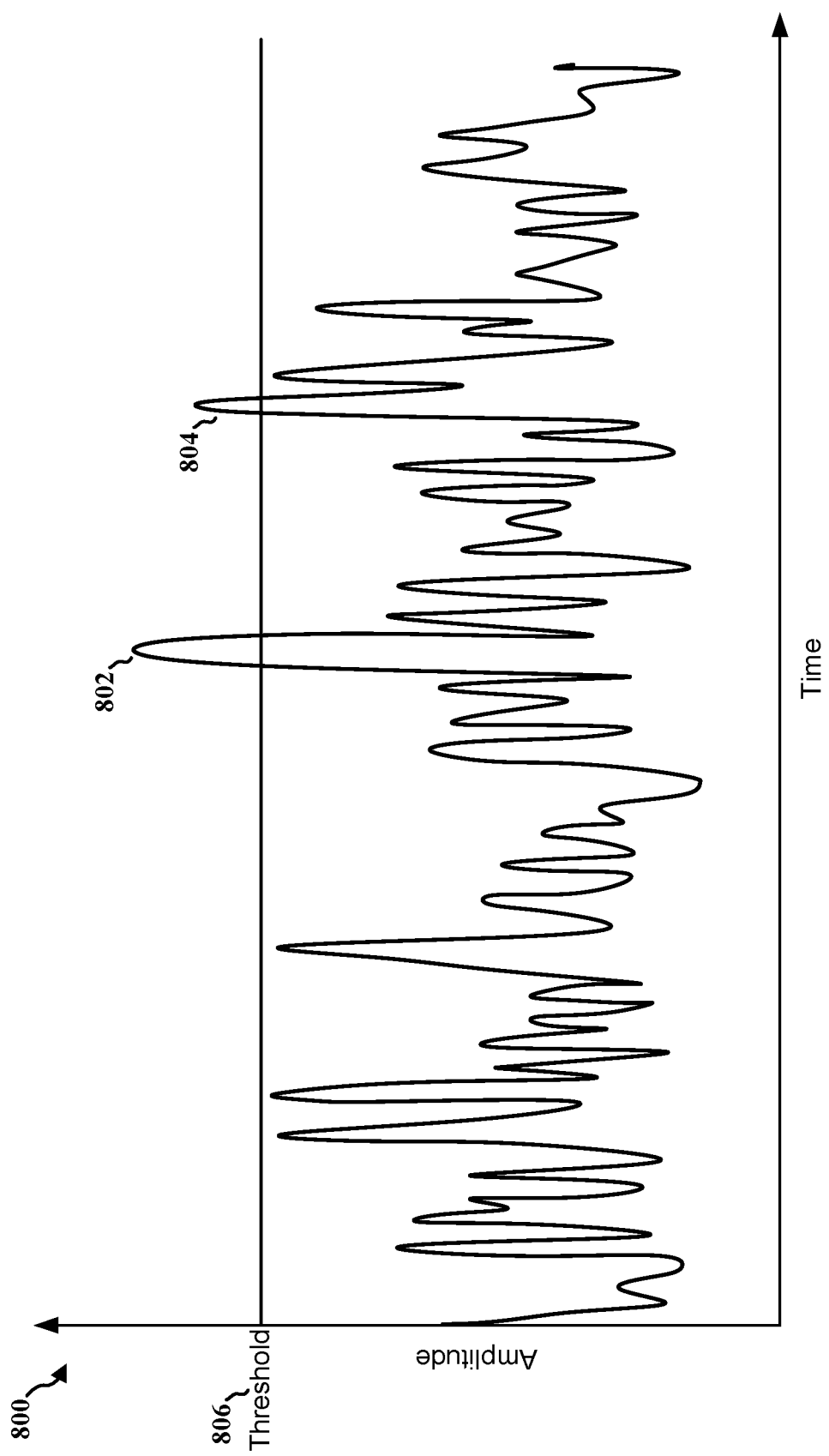
FIG. 8 is a diagram illustrating an example of a time domain data waveform in accordance with various aspects of the present disclosure.

FIG. 8 is a diagram 800 illustrating an example of a time domain data signal (e.g., x or an OFDM signal). A threshold 806 may be defined/configured for a transmitting device for determining whether a particular waveform of a time domain data has one or more peaks exceeding the threshold 806, and the transmitting device may determine whether any of the one or more peaks is to be reduced. For example, based on the threshold 806, a transmitting device may be able to determine that the waveform has a peak 802 and a peak 804 exceeding the threshold 806. The transmitting device may also determine the magnitude and location of the peaks, and/or the largest peak among the peaks (e.g., the peak 802).

Figure 9:
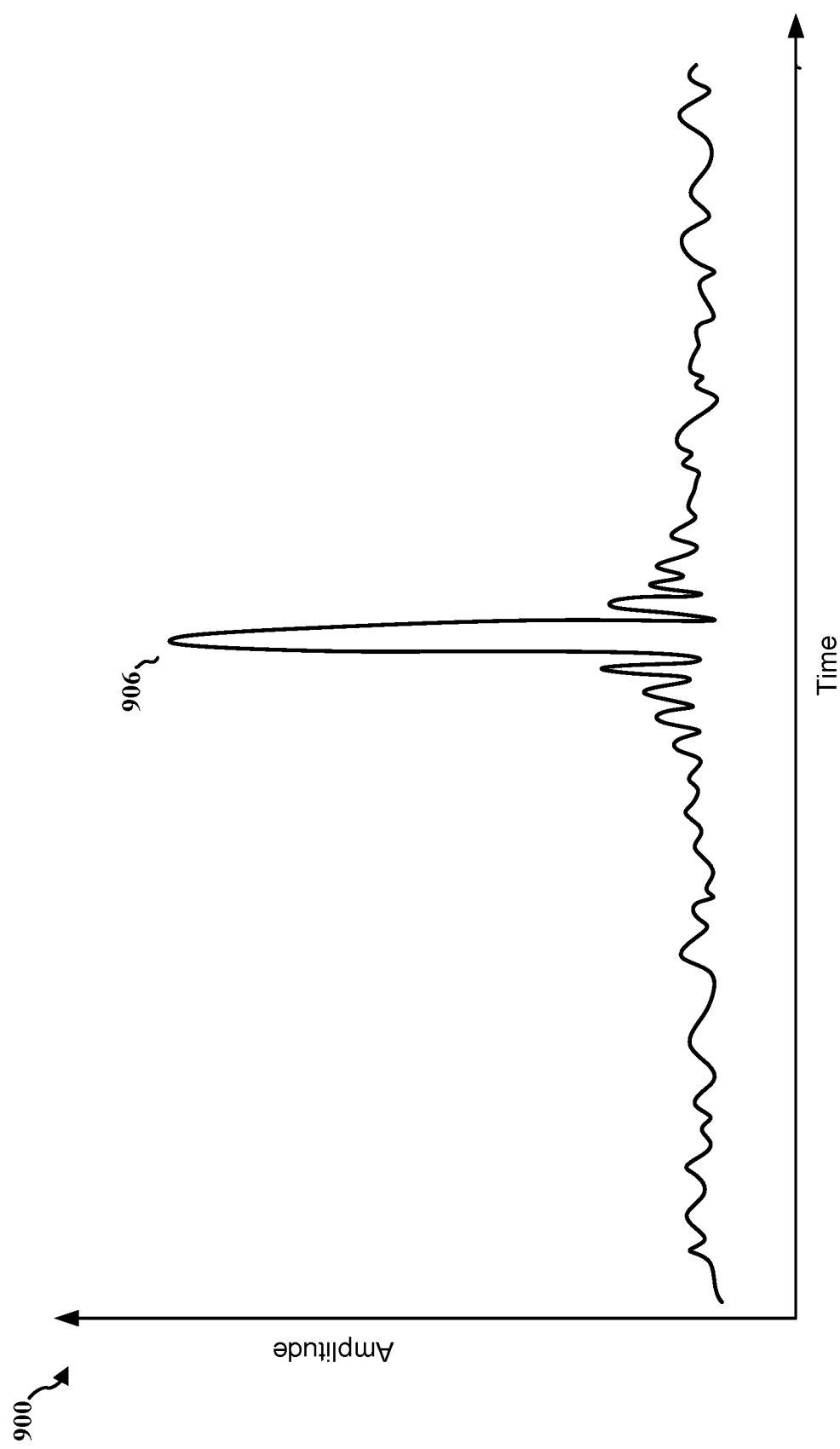
FIG. 9 is a diagram illustrating an example of a time domain kernel in accordance with various aspects of the present disclosure.

FIG. 9 is a diagram 900 illustrating an example of a time domain kernel for p. If the number of PRTs is sufficiently large and the location of the PRTs are chosen properly, then the time domain kernel p may look like a delta function with negligible side-lobes as shown by the diagram 900. For example, the time domain signal may appear as a waveform with a single peak 906, where the single peak 906 may be relatively narrow in width compare to the largest peak of x (e.g., 802 of FIG. 8). Next, the SCR-TR algorithm may circularly shift p in the time-domain until p aligns with the largest peak of x.

Figure 10:
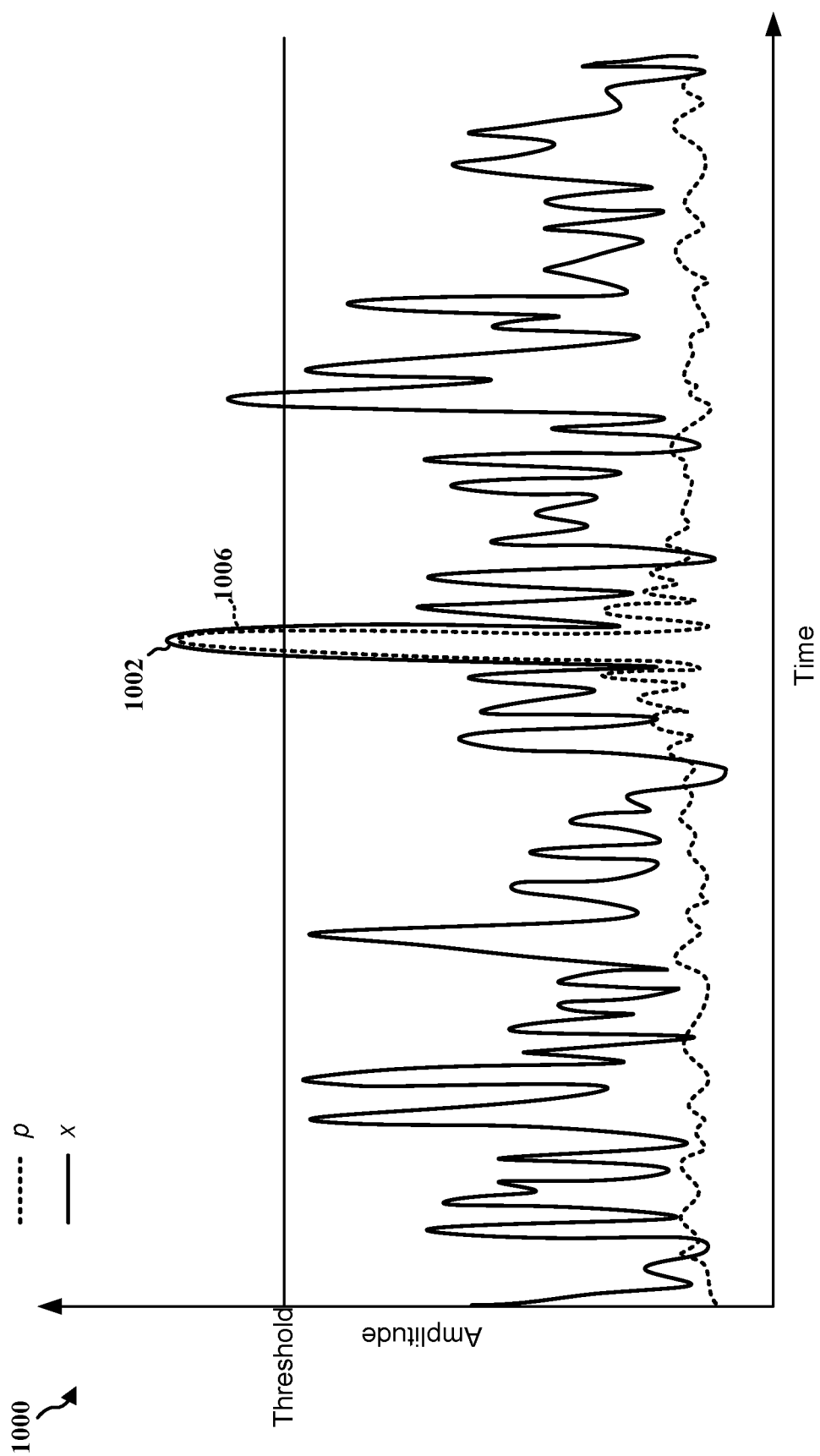
FIG. 10 is a diagram illustrating an example of a circular shifting and alignment based on SCR-TR algorithm in accordance with various aspects of the present disclosure.

FIG. 10 is a diagram 1000 illustrating an example of circular shifting and alignment based on the SCR-TR algorithm. First, the SCR-TR algorithm may determine the location of the largest peak of x. Let $j \in [LN]$ be the index, where L may denote an oversampling factor, N may denote a total number of granted tones and j may be an element of LN. Next, the algorithm circularly shifts p until the peak 1006 of p aligns with the largest peak 1002 of x, which may be represented by $p^j=\text{circshift}(p,j)$. The algorithm then subtracts the scaled and shifted p from x to obtain $$x_{new} = x - \frac{|x(j)| - \mu}{p(0)} p_j e^{i \angle x(j)},$$

where $\mu$ is the target peak, $\angle x(j)$ is the phase of $x(j)$, and $i=\sqrt{-1}$. In other words, the cancellation signal may be circularly shifted to the peak location of x and then subtracted from the original information signal, so that the power of the peak tones may be reduced.

Figure 11:
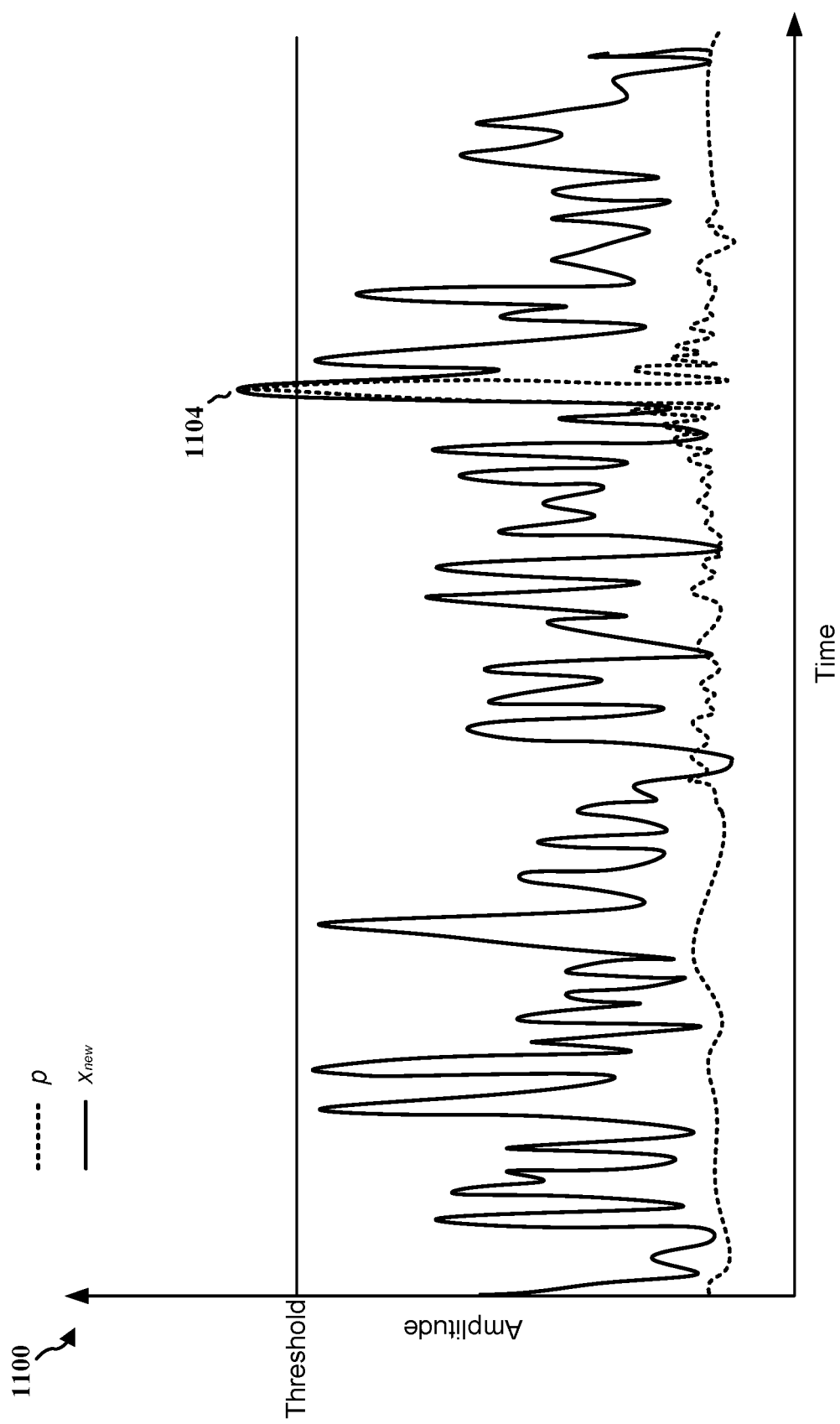
FIG. 11 is a diagram illustrating an example of a circular shifting and alignment based on SCR-TR algorithm in accordance with various aspects of the present disclosure.

FIG. 11 is a diagram 1100 illustrating $x_{new}$, where the previous largest peak of x has been subtracted by the scaled and shifted p. The SCR-TR algorithm may iterate this process serval times to optimize the PAPR reduction. For example, the process may be performed in several iterations, starting from the highest peak and canceling one peak per iteration. As shown by FIG. 11, after previous largest peak of x (e.g., the peak 802, 1002) is eliminated from x, the algorithm may circularly shift p to a next highest peak 1104 of x that is also above the threshold, and subtracted the peak 1104 by the scaled and shifted p and so on. Note that circularly shifting p in the time domain does not impact the location of reserved tones in the frequency domain, but it may disturb their phase. For example, phases may be added to P. However, as data tones (e.g., subsets 2-4, 7, 9 . . . of FIG. 7) are assigned with the value zero (0), their values may not be changed because adding phase to zero result in zero. On the other hand, the phase of PRTs may be modified because they are assigned with the value one (1). So, the PRT may become a complex number with magnitude one and the added phase. Thus, circularly shifting p does not impact the location of reserved tones. By applying the SCR-TR algorithm for the tone reservation, PAPR of the OFDM symbol may be reduced to a proper margin, and the corresponding PA may be configured with a lower IBO. For example, The OFDM symbol using 64 PRTs or 96 PRs may have an overall lower PAPR compare to the OFDM symbol that does not use any PRTs.

Techniques discussed herein can provide a number of benefits. For example, some aspects presented herein may improve the efficiency and performance of the tone reservation PAPR reduction technique by allocating PRTs based at least in part on a channel condition, such as the signal-to-noise ratio (SNR) of the channel. Additionally, or alternatively, some aspects presented herein may enable a transmitting device to allocate PRTs to frequency resources that have lower SNR. As a receiving device may be configured to not decode PRTs, frequency resource with better SNR (e.g., stronger tones) may be left for transmitting the data tones to increase the performance of the transmission.

Figure 12:
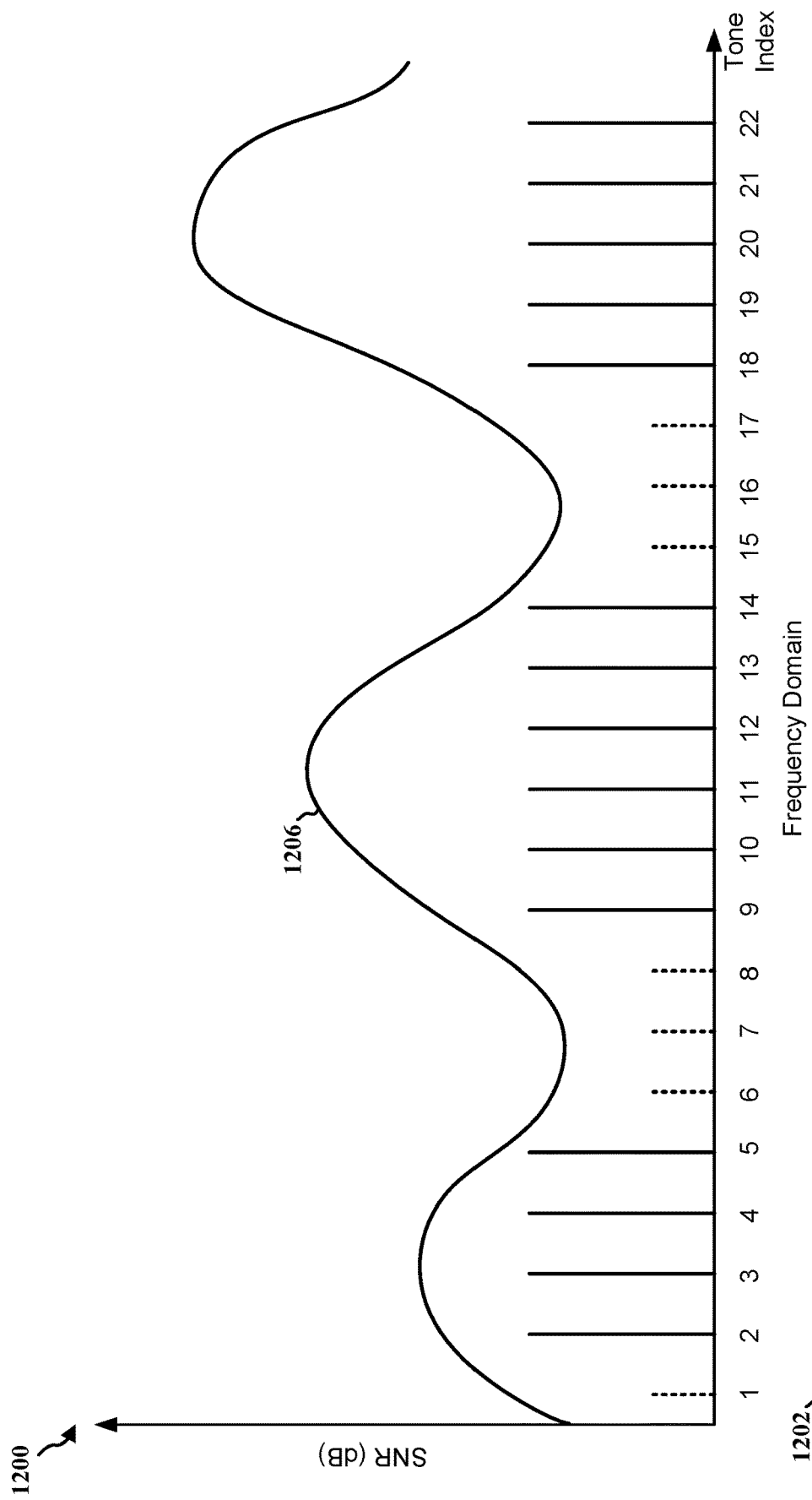
FIG. 12 is a diagram illustrating an example of locating PRT based on SNR of the channel in accordance with various aspects of the present disclosure.

FIG. 12 is a diagram 1200 illustrating an example of a PRT allocation based on SNR of the channel. In one example, a transmitting device (e.g., a UE) may first estimate the channel condition of a channel by measuring the SNR 1206 of the channel within a frequency resource or band, where the frequency resource or band may include a plurality of tones. The transmitting device, such as a UE, may obtain the SNR 1206 based on the CSI-RS of the serving cell. Once the transmitting device has estimated the channel condition (e.g., the SNR 1206) for the plurality of tones, the transmitting device may allocate PRTs to the plurality of tones based at least in part on the estimated channel condition. In some examples, the allocation of PRTs may depend on tones having lower/lowest SNR. For example, tones 1, 6, 7, 8, 15, 16 and 17 in FIG. 12 may have SNR lower than other tones. As a receiving device may skip decoding PRTs, the SNR of PRTs may not be important to the receiving device. Thus, the transmitting device may use tones with lower SNR (e.g., tones 1, 6-8 and 15-17) for PRTs 1202, and use tones with better SNR (e.g., tones 10-13 and 19-22, etc.) for the data tones 1204 (e.g., information signal). In other examples, the allocation of PRTs may depend on tones having higher/highest SNR. For example, tones 2-5, 9-14, and 18-22 in FIG. 12 may have SNR higher than other tones. As tones with higher SNR may be more tolerable to noise, which may be more suitable for inserting PRTs. In other examples, the transmitting device may allocate PRTs that have other desirable properties in addition to having low SNR. For example, the transmitting device may desire to transmit PRTs near the beginning and/or the end of the transmission, such as on the sides of a frequency resource (e.g., tones 1, 2, 3 and 20, 21, 22 of FIG. 14, etc.).

In other example, a PRT table or a PRT set including one or more PRT sequences may be pre-defined and fixed at the transmitting device and the receiving device. For example, each PRT sequence in the PRT table or set may include a fixed number of PRTs at pre-fixed locations (e.g., fixed PRT pattern), and the number of PRTs and/or their locations may be different for each PRT sequence. There may also be overlaps between different PRT sequences. For example, one PRT sequence may have PRTs at tones 1, 2, 3, 5, 7, another PRT sequence may have PRTs at tones 1, 2, 4, 6, 7 (with some overlap), and another PRT sequence may have PRTs at tones 4, 6, 8, 9, 10 (without overlap), etc.

Figure 13:
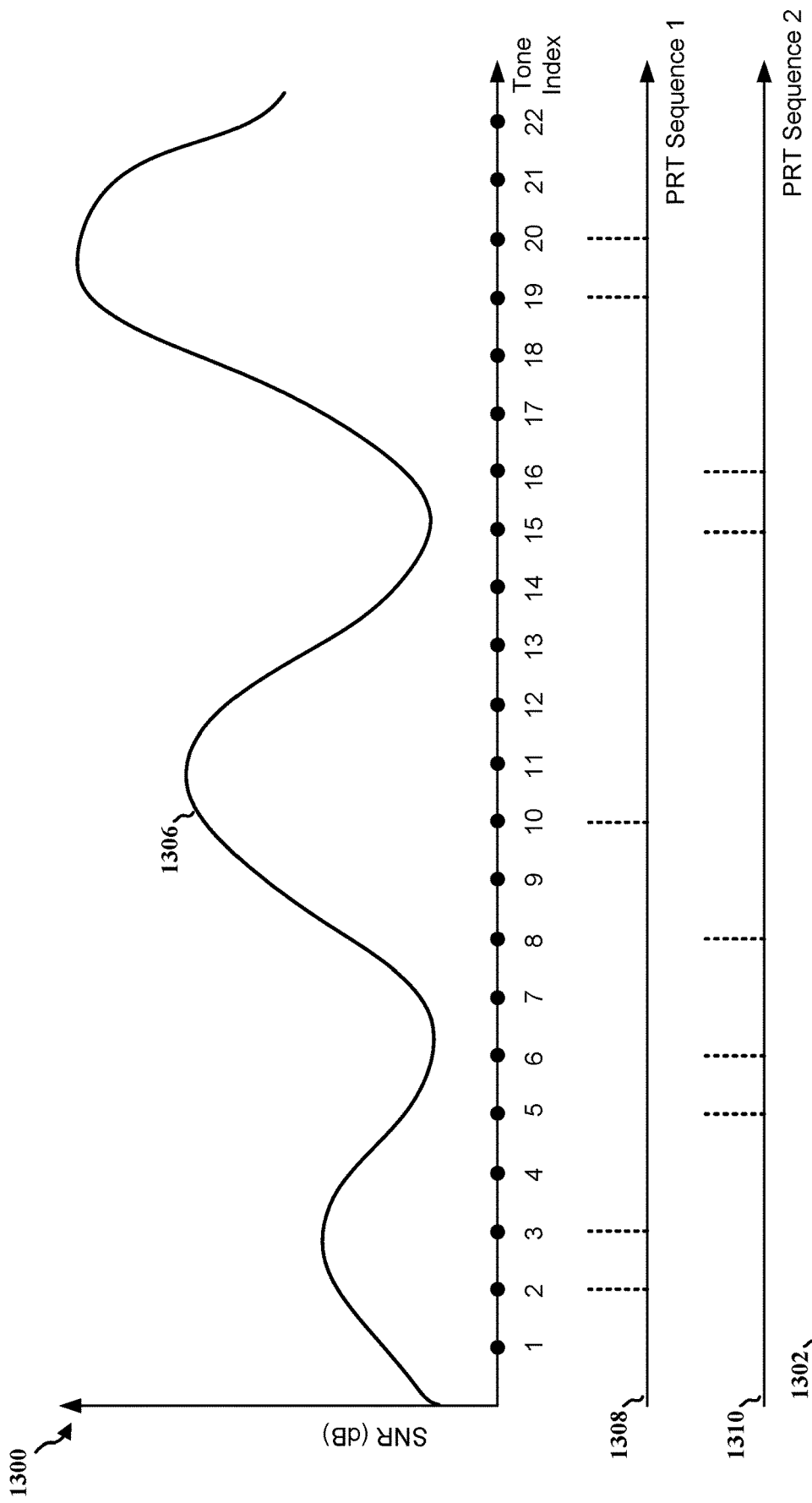
FIG. 13 is a diagram illustrating an example of locating PRT based on an SNR table in accordance with various aspects of the present disclosure.

FIG. 13 is a diagram 1300 illustrating an example of a PRT table. A PRT table may include a first PRT sequence 1308 and a second PRT sequence 1310, where tones 2, 3, 10, 19 and 20 of the first PRT sequence 1308 are allocated with PRTs 1302, and tones 5, 6, 8, 15 and 16 of the second PRT sequence 1310 are allocated with PRTs 1302. After a transmitting device estimates the channel condition (e.g., SNR 1306) of a transmitting channel, the transmitting device may choose a PRT sequence (the first PRT sequence 1308 or the second PRT sequence 1310) within the PRT table that is most suitable for the transmission and/or satisfies certain condition or desirable properties. In one example, the transmitting device may first identify tones that have the lowest SNR (e.g., ten tones staring from the lowest SNR, etc.), then the transmitting device may choose a PRT sequence that maximizes the overlap with the lowest-SNR tones (e.g., a PRT sequence with most PRTs 1302 located in the ten lowest SNR tones). In other words, the transmitting may determine how many PRTs within each PRT sequence are located at tones with lower SNR, and choose a PRT sequence that has most PRTs 1302 locating at lower SNR tones. For example, as PRTs in the second PRT sequence 1310 have more overlap with the low-SNR tones, the transmitting device may select the second PRT sequence 1310 for the transmission. In another example, the transmitting device may first identify tones that have the highest SNR (e.g., ten tones staring from the highest SNR, etc.), then the transmitting device may choose a PRT sequence from the PRT table that maximizes the overlap with the highest-SNR tones (e.g., a PRT sequence with most PRTs 1302 located in the ten highest SNR tones). In other words, the transmitting may determine how many PRTs 1302 within each PRT sequence are located at tones with higher SNR, and choose a PRT sequence that has most PRTs 1302 locating at higher SNR tones. For example, as PRTs 1302 in the first PRT sequence 1308 have more overlap with the high-SNR tones, the transmitting device may select the first PRT sequence 1308 for the transmission. In other example, the transmitting device may also choose a PRT sequence that has PRTs 1302 with least overlap with tones that have high or low SNR. For example, the transmitting device may identify twenty tones starting from the tone with highest/lowest SNR, and select a PRT sequence that has the least overlap with these twenty selected high/low SNR tones.

Figure 14:
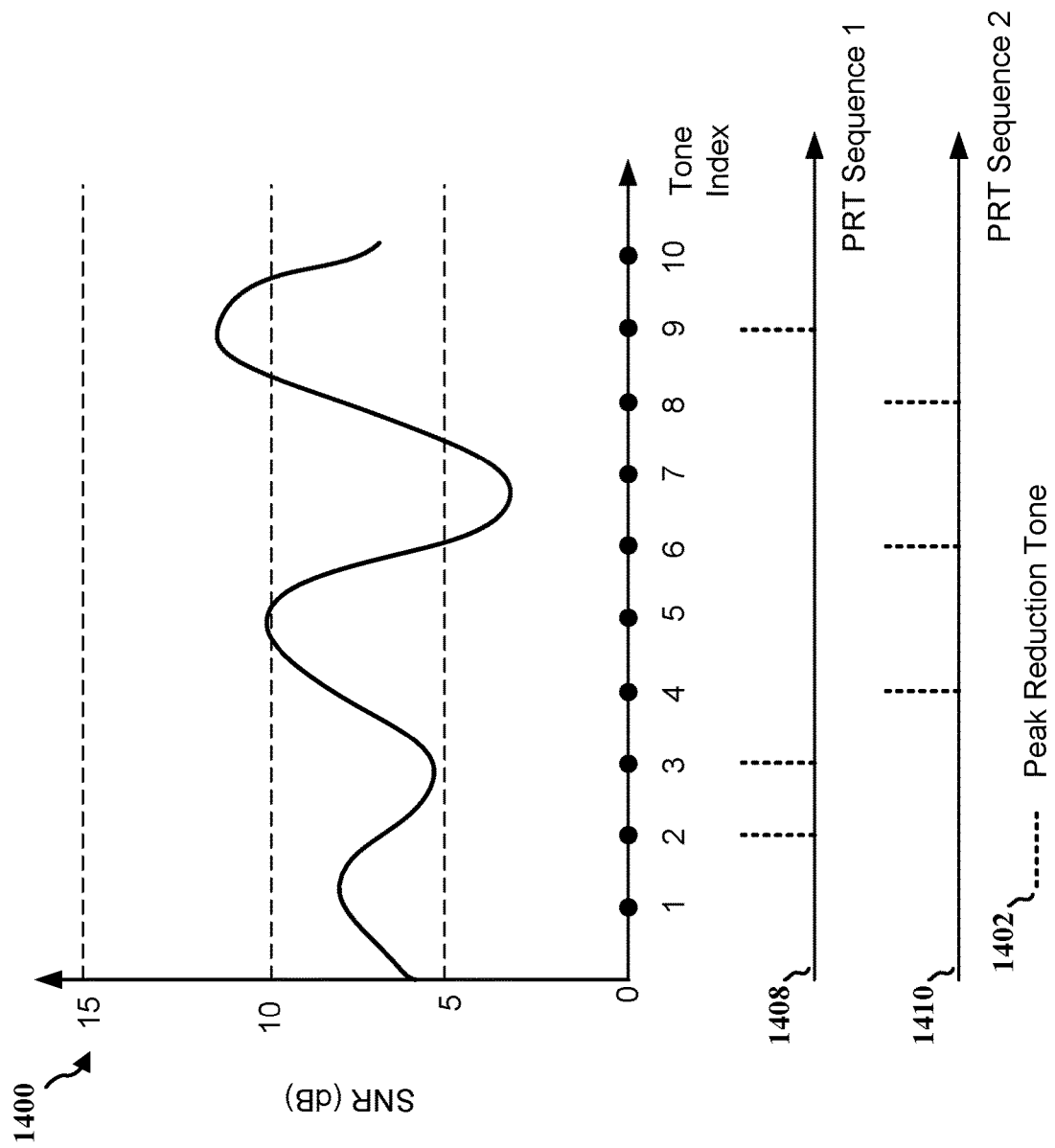
FIG. 14 is a diagram illustrating an example of choosing a PRT sequence based on an average SNR in accordance with various aspects of the present disclosure.

In another example, the transmitting device may calculate the average SNR for each PRT sequence, and choose a PRT sequence with the lowest or highest average SNR. FIG. 14 is a diagram 1400 illustrating an example of choosing a PRT sequence based on the average SNR. In one example, a first PRT sequence 1408 may have PRTs 1402 allocated at tones 2, 3 and 9, and a second PRT sequence 1410 may have PRTs 1402 allocated at tones 4, 6 and 8. The SNR for tones 2, 3 and 9 of the first PRT sequence 1408 may be 7 dB, 5.5 dB, and 11.5 dB respectively, such that the average SNR for PRTs in the first PRT sequence 1408 may be approximately 8 dB. The SNR for tones 4, 6 and 8 of the second PRT sequence 1410 may be 8 dB, 5 dB, and 8 dB respectively, such that the average SNR for PRTs in the second PRT sequence 1410 may be approximately 7 dB. If the transmitting device is configured to select a PRT sequence with a lowest average SNR, the transmitting device may select the second PRT sequence 1410 as the second PRT sequence 1410 has a lower SNR average. On the other hand, if the transmitting device is configured to select a PRT sequence with a highest average SNR, the transmitting device may select the first PRT sequence 1408 as the first PRT sequence 1408 has a higher SNR average.

In other words, a transmitting device may customarily choose a number of tones K out of available tones N (e.g., total tones granted to the transmitting device) as PRTs ("Option 1"), where K may be a fixed parameter or a customized parameter. The transmitting device may allocate PRTs in K to the lowest/highest SNR tones among all the N tones, and additionally or alternatively, allocate PRT tones to places that satisfy other desirable properties (e.g., in addition to being low/high SNR). For example, the transmitting device may be configured to transmit PRTs on the side of a band (e.g., left and right sides). If the PRTs are to be transmitted on one side of the band, the transmitting device may choose the side with lower SNR for transmission. Alternatively, or in addition to Option 1, one or more PRT sequences may be pre-configured or fixed in a PRT table or set, where the transmitting device may choose a PRT sequence from the PRT table or set based on one or more criteria ("Option 2"). For example, the transmitting device may select a PRT sequence that achieves the lowest/highest average SNR over all the tones associated with the PRT sequence, or a PRT sequence that achieves maximum overlap with a set of R weakest/strongest tones (where R is a parameter), or a PRT sequence that achieves minimum/maximum overlap with a set of S strongest tones (where S is a parameter), etc. In other words, the transmitting device may choose a PRT sequence that has a highest amount of overlap with a subset of tones that have SNR lower than other tone(s) in the plurality of tones. For example, the plurality of tones may include ten (10) tones where tones #1 to #4 have SNR lower than tones #5 to #10. If a transmitting device is configured to select a PRT sequence that achieves a maximum overlap with a set of weakest tones (e.g., tones with SNR lower than other tones in a set of tones), the transmitting device may select a PRT sequence with more PRTs/reserved tones overlapping with tones #1 to #4. For example, if there are two PRT sequences and the first PRT sequence includes PRTs overlapping with tones #2, #3, #4, #7 and #8 while the second TRP sequence includes PRTs overlapping with tones #2, #5, #6, #7 and #8, the transmitting device may select the first PRT sequence as the first PRT sequence has more PRTs (e.g., reserved tones) overlapping tones with lower SNR (e.g., tones #1 to #4). On the other hand, if a transmitting device is configured to select a PRT sequence that achieves a minimum overlap with a set of weakest tones (or a maximum overlap with a set of strongest tones), the transmitting device may select a PRT sequence with least PRTs/reserved tones overlapping with tones #1 to #4, or with most PRTs/reserved tones overlapping with tones #5 to #10, etc. For example, if there are two PRT sequences and the first PRT sequence includes PRTs overlapping with tones #2, #3, #4, #7 and #8 while the second TRP sequence includes PRTs overlapping with tones #2, #5, #6, #7 and #8, the transmitting device may select the second PRT sequence as the second PRT sequence has less PRTs (e.g., reserved tones) overlapping tones with lower SNR (e.g., tones #1 to #4) or more PRTs overlapping tones with higher SNR (e.g., tones #5 to #10).

In addition to specific-transmission based aspects, techniques also include receiver-specific features. For example, in order for a receiving device (e.g., base station) to decode a transmission involving the tone reservation, the receiving device may be configured to determine which tones within a transmission are data tones and which tones are PRTs. This determination aids and/or enables a receiving device to ignore or bypass PRTs and decode data tones. In some examples, a receiving device may ignore PRTs (e.g., the reserved tones) actively. For example, the receiving device may be configured to actively ignore the PRTs, where the receiving device may perform one or more actions to ignore the PRTs, such as skipping their reception, discarding received PRTs, etc. In other examples, a receiving device may ignore PRTs (e.g., the reserved tones) passively. For example, the receiving device may be configured to passively ignore the PRTs, where the receiving device may not perform an action when it receives PRTs. As such, the "ignore" or "skip" action performed by a receiving device may be configured to be active, passive, or both. In addition, the receiving device may also be configured to determine whether the transmitting device is sending the transmission with the tone reservation in the first place, what types of the tone reservation (e.g., Option 1 or Option 2) is the transmitting device using, and/or which PRT sequence is chosen by the transmitting device (e.g., if Option 2 is used), etc.

Channel reciprocity features may also be leveraged in receive and transmit operations. In one example, if channel reciprocity applies to a communication between a transmitting device and a receiving device, the receiving device may be able to determine which tones the transmitting device are using as PRTs. For example, when channel reciprocity holds, the uplink transmission and the downlink transmission may match or may be identical. Thus, the channel estimation of the uplink direction at the transmitting device may be utilized for link adaptation in the downlink direction, and vice versa. Based on the channel estimation, the receiving device may apply or replicate the same PRTs selection process (e.g., Option 1, Option 2, etc.) as the transmitting device, such that the receiving device may determine which tones may be selected by the transmitting device for PRTs. For example, if the receiving device determines that the transmitting device is sending a transmission with twenty (20) PRTs in lowest SNR tones, such as described in connection with FIG. 12 or Option 1, the receiving device may apply the same selection logic as the transmitting device to determine which tones are PRTs, e.g., by selecting twenty lowest/highest SNR tones based on the channel estimation. On the other hand, if the channel reciprocity does not apply, the transmitting device may inform the location of the PRTs (or alternatively the location of the data tones) via explicit signaling. For example, in a transmission with ten tones (e.g., 1-10), the transmitting device may inform the receiving device via signaling that tones 1, 3, 4, 5, 8 are PRTs, or that tones 2, 6, 7, 9, 10 are data tones, etc.

In some examples, a receiving device (e.g., a base station) may determine whether the tone reservation may be used by a transmitting device (e.g., a UE) via signaling. For example, the receiving device may add or specify one bit in a control information section of a transmission to indicate to the transmitting device whether to send a transmission with the tone reservation. For example, if the receiving device indicates that the tone reservation may not be used, then the transmitting device may not send transmission with the tone reservation. if the receiving device indicates that the tone reservation is to be used, then the transmitting device may send transmission with the tone reservation. Optionally, the transmitting device may inform the receiving device on whether the transmitting device is sending the transmission with the tone reservation, such as by using or adding one bit in a signaling. If the transmitting device indicates that it is sending the transmission with the tone reservation, the receiving device may then be configured to a proper setting to receive the transmission. In addition, the receiving device and/or the transmitting device may add or specify another bit in the signaling to inform the transmitting device and/or the receiving device on whether Option 1 or Option 2 may be used or is used for the tone reservation.

In other example, when the pre-defined PRT table or set is used for the tone reservation, such as described in connection with FIG. 13 or Option 2, the PRT table or set may be fixed as a standard for the transmitting device and the receiving device. The transmitting device and/or the receiving device may also use additional signaling bit(s) to indicate to each other which PRT sequence is used (e.g., if indicated by the transmitting device) or may be used (e.g., if indicated by the receiving device). The length of the signaling bit(s) may depend on the number of PRT sequence available in the PRT table or set. The transmitting device may also assist the receiving device in determining which PRT sequence is used via explicit signaling. For example, if the PRT table or set contains $2^8=256$ possible PRT sequences, the transmitting device may use an extra tone with 256-QAM modulation to signal 8 bits to the receiving device, which may uniquely determine the PRT sequence the transmitting device is using.

For the signaling, such as indicating whether the tone reservation may be used, whether Option 1 or Option 2 is used for the tone reservation, and/or which PRT sequence is used, etc., may be performed via DCI, MAC-control element (MAC-CE), RRC and/or control channels (e.g., PUCCH, PDCCH) depending whether the signaling is transmitted by a base station or a UE. For example, when a base station is indicating to the UE whether to use PRT(s) or not, the base station may also indicate to the UE whether Option 1 or Option 2 may be used. This indication or signaling may be carried in downlink channels such as RRC, DCI, MAC-CE, etc. When the UE is informing the base station which tones are PRTs, this may be done via signaling the specific row of the PRT table (e.g., if the PRT table is used) or via explicitly signaling the PRT locations (e.g., if the PRT table is not used). This indication or information from the UE may be carried in the PUCCH or via a new uplink channel.

Figure 15:
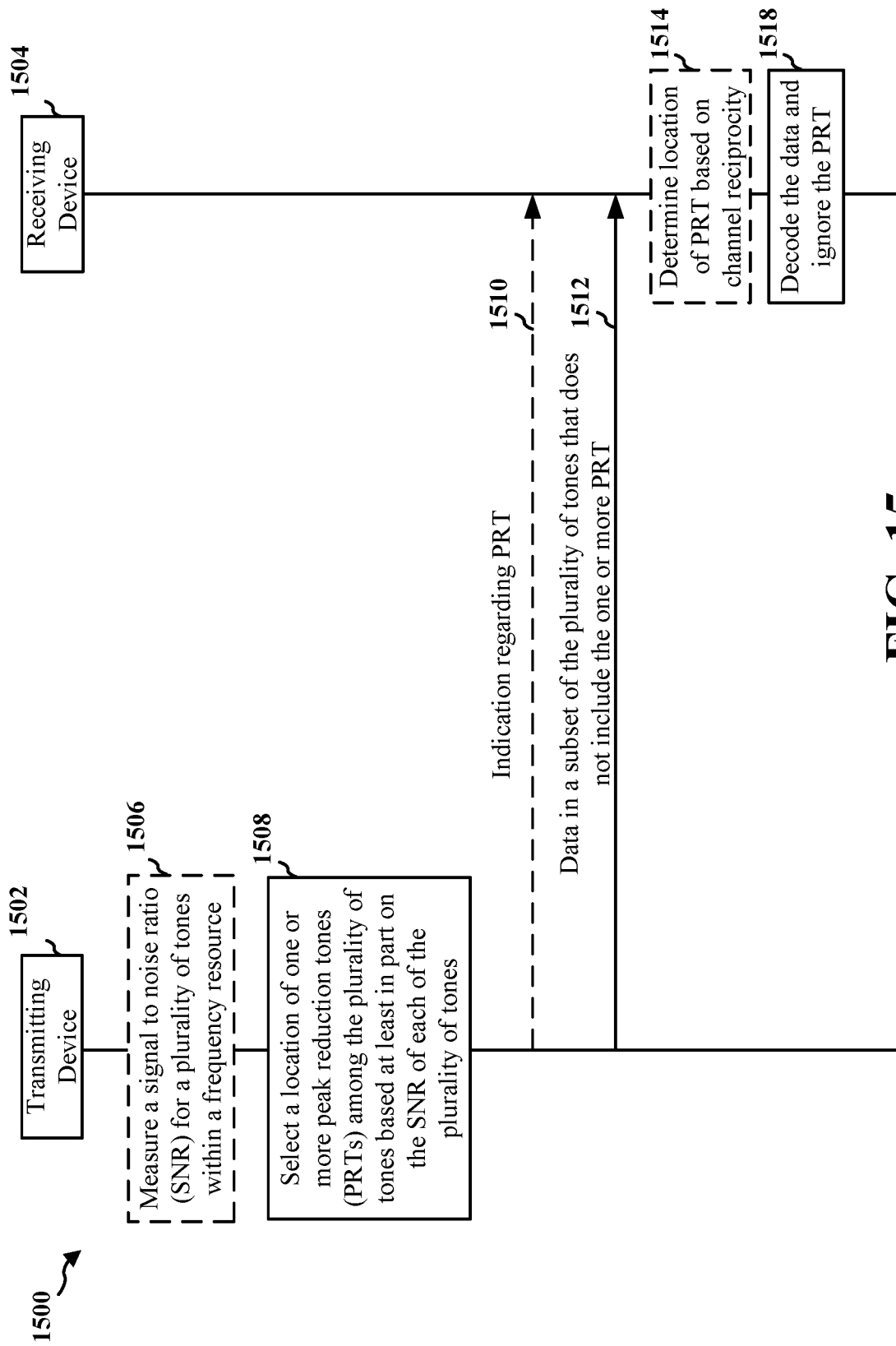
FIG. 15 illustrates an example communication flow between a transmitting device and a receiving device in accordance with various aspects of the present disclosure.

FIG. 15 illustrates an example communication flow 1500 between a transmitting device 1502 and a receiving device 1504 according to aspects of the present disclosure. At 1506, the transmitting device 1502 may measure the SNR for a plurality of tones within a frequency resource (e.g., resource block(s) of an OFDM symbol). For example, if the transmitting device 1502 is a UE, the transmitting device 1502 may obtain the SNR based on the CSI-RS.

After the transmitting device 1502 has measured the SNR for the plurality of tones, at 1508, the transmitting device 1502 may select a location of one or more PRTs (e.g., reserved tones) among the plurality of tones based at least in part on the SNR of each of the plurality of tones, such as described in connection with FIG. 12. In one example, as the receiving device 1504 may be configured to skip decoding PRTs, the SNR of PRTs may not be important to the receiving device 1504. Thus, the transmitting device 1502 may use tones with lower SNR for transmitting PRTs, and use tones with better SNR for transmitting the data tones 1204. This may also reduce the overhead of the transmission as the frequency resources with lower SNR are not used for transmitting data, which may not be received by the receiving device. In another example, the transmitting device 1502 may use tones with higher SNR for transmitting PRTs, and use tones with lower SNR for transmitting the data tones 1204.

In other example, as described in connection with FIG. 13, a PRT table or a PRT set including one or more PRT sequences may be pre-defined and fixed for the transmitting device 1502 and the receiving device 1504. Each PRT sequence may include PRTs at pre-fixed locations, and each PRT sequence may have different PRT patterns from each other. The location of some PRTs may overlap for some PRT sequences. Once the transmitting device 1502 has the estimated the channel condition (e.g., has measured the SNR for the plurality of tones within the frequency resource), the transmitting device may choose a PRT sequence within the PRT table that is most suitable for the transmission and/or satisfies certain condition or desirable properties. For example, the transmitting device 1502 may choose a PRT sequence that has a highest/lowest amount of overlap with a subset of N tones having a lowest/highest SNR among the plurality of tones, where N may be a pre-defined number. In other example, the transmitting device 1502 may also choose a PRT sequence that has a highest/lowest amount of overlap with a subset of N tones having a highest/lowest SNR among the plurality of tones, where N is a pre-defined number, etc.

At 1512, after allocating the PRTs, the transmitting device 1502 may transmit data (e.g., data tones) in a subset of the plurality of tones that does not include the one or more PRTs to the receiving device 1504.

For the receiving device 1504 to decode a transmission involving the tone reservation, the receiving device 1504 may be configured to determine which tones within the transmission are data tones and which tones are PRTs, such that the receiving device 1504 may ignore the PRTs and decode the data tones. In some examples, the receiving device 1504 may ignore PRTs (e.g., the reserved tones) actively. For example, the receiving device 1504 may be configured to actively ignore the PRTs, where the receiving device 1504 may perform one or more actions to ignore the PRTs, such as skipping their reception, discarding received PRTs, etc. In other examples, the receiving device 1504 may ignore PRTs (e.g., the reserved tones) passively. For example, the receiving device 1504 may be configured to passively ignore the PRTs, where the receiving device 1504 may not perform an action when it receives a transmission including PRTs. As such, the "ignore" or "skip" action performed by the receiving device 1504 may be configured to be active, passive, or both (e.g., active for some receptions and passive for other receptions, etc.). In addition, the receiving device 1504 may also be configured to determine whether the transmitting device is sending the transmission with the tone reservation in the first place, what types of the tone reservation (e.g., Option 1 or Option 2) is the transmitting device using, and/or which PRT sequence is chosen by the transmitting device (e.g., if Option 2 is used), etc.

In one example, at 1514, the receiving device 1504 may determine the location of PRTs based on the channel reciprocity property between the uplink and downlink channels. For example, when channel reciprocity holds, the uplink transmission and the downlink transmission may match exactly. Thus, the channel estimate of the uplink direction at the transmitting device may directly be utilized for link adaptation in the downlink direction and vice versa. Based on the channel estimation, the receiving device 1504 may apply or replicate the same PRTs selection process (e.g., Option 1, Option 2, etc.) as the transmitting device 1502, such that the receiving device 1504 may know which tones are selected by the transmitting device 1502 for PRTs.

The transmitting device 1502 may notify the receiving device 1504, such as at 1510, whether the transmitting device 1502 is sending transmission with tone reservation via signaling. For example, the transmitting device 1502 may inform the receiving device 1504 using or adding one bit in a signaling. If the transmitting device 1502 indicates that it is sending the transmission with the tone reservation, the receiving device 1504 may then be configured to a proper setting to receive the transmission. In addition, at 1510, the transmitting device 1502 may further add or specify another bit in the signaling to inform the receiving device what type of tone reservation (e.g., Option 1 or Option 2) is used by the transmitting device is tone reservation is used. If Option 1 is used and channel reciprocity is not available, at 1510, the transmitting device 1502 may further indicate the location of PRTs via the signaling. If Option 2 is used, then at 1510, the transmitting device 1502 may further indicate to the receiving device 1504 which PRT sequence from a PRT table or set is chosen by the transmitting device. Both the transmitting device 1502 and the receiving device 1504 may have the PRT table or set pre-fixed with them.

At 1518, based on receiving device's 1504 determination about location of PRTs, whether based on the indication received at 1510 or based on the channel reciprocity at 1514, the receiving device 1504 may decode the data and ignore the PRTs.

For purposes of illustration, the UE may be illustrated as the transmitting device and the base station may be illustrated as the receiving device in the examples below. However, in other examples, the UE may also be the receiving device and the base station may also be the transmitting device.

Figure 16:
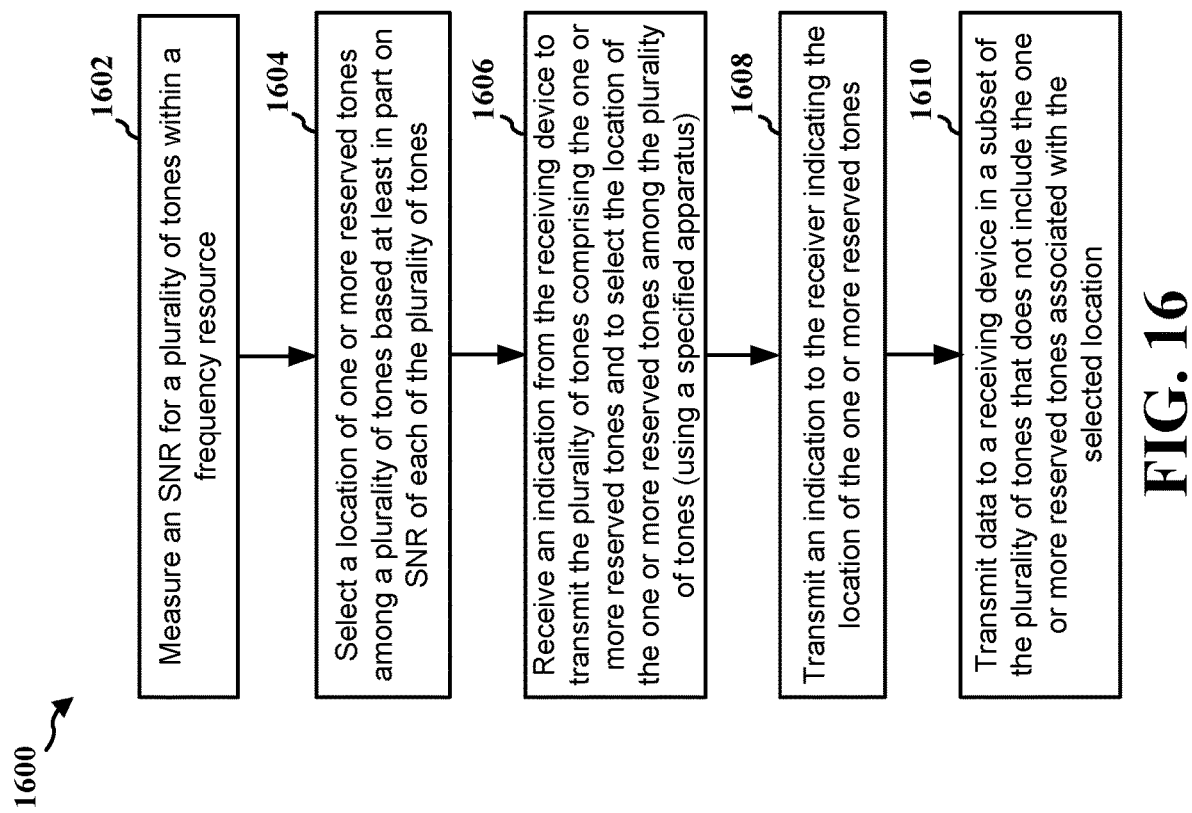
FIG. 16 illustrates a flowchart of a method of wireless communication in accordance with various aspects of the present disclosure.

FIG. 16 illustrates a flowchart of a method 1600 of wireless communication. The method may be performed by the transmitting device 1502; the apparatus 1702; a processing system, which may include the memory 360 and which may be a UE 350 or a component of the UE 350, such as the TX processor 368, the RX processor 356, and/or the controller/processor 359). In some aspects, the method may be performed by a UE or a component of a UE (e.g., UE 104 or 350). In other aspects, the method may be performed by a base station (e.g., base station 102, 180, or 310). The method may enable the transmitting device (e.g., which may be a UE) to measure SNR for a plurality of tones within a frequency resource and locate one or more PRTs among the plurality of tones based at least in part on the SNR of each of the plurality of tones. The transmitting device may then optimize the transmission by transmitting data using tones with higher SNR and using tones with lower SNR for PRTs.

At 1602, the transmitting device (e.g., which may be a UE) may measure an SNR for a plurality of tones within a frequency resource, such as described in connection with FIGS. 12 and 15. For example, at 1506, the transmitting device 1502 may measure an SNR for a plurality of tones within a frequency resource. The measurement of the SNR may be performed, e.g., by the SNR measurement component 1740 of the apparatus 1702 in FIG. 17. In one example, the frequency resource may include one or more resource blocks within an OFDM symbol. In another example, the transmitting device may obtain the SNR based on the CSI-RS.

At 1604, the transmitting device may select a location of one or more reserved tones among a plurality of tones based at least in part on SNR of each of the plurality of tones, such as described in connection with FIGS. 12 and 15. For example, at 1508, the transmitting device 1502 may select a location of one or more PRTs among the plurality of tones based at least in part on the SNR of each of the plurality of tones. The section of the location of the one or more TRPs may be performed, e.g., by the PRT selection component 1742 of the apparatus 1702 in FIG. 17.

In one example, selecting the location of the one or more reserved tones among the plurality of tones may include selecting tones having a lower SNR among the plurality of tones, and optionally also selecting tones having satisfying at least one condition (e.g., within specific location, etc.), such as described in connection with FIG. 12. In other words, the transmitting device may select the location of the one or more reserved tones among the plurality of tones based on selecting a subset of tones that has SNR lower than other tones in the plurality of tones. In another example, selecting the location of the one or more reserved tones among the plurality of tones may include selecting tones having a higher SNR among the plurality of tones, and optionally also selecting tones having satisfying at least one condition (e.g., within specific location, etc.), such as described in connection with FIG. 12.

In other examples, selecting the location of the one or more reserved tones among the plurality of tones may include choosing a sequence (e.g., a PRT sequence) from a table (e.g., a PRT table), where the table may include one or more sequences and each sequence may have a fixed allocation for the one or more PRT, such as described in connection with FIG. 13. The allocation for the one or more reserved tones in each sequence may be different from other sequences within the table, but there may be some overlap reserved tones or no overlap between different sequences. The table may be pre-defined in the transmitting device and the receiving device. By using the table, the transmitting device may choose a sequence from the table with a lowest average SNR, such as described in connection with FIG. 14. Alternatively, the transmitting device may also choose a sequence from the table that has a highest amount of overlap with tones having a lowest SNR among the plurality of tones or a sequence that has a lowest amount of overlap with tones having a highest SNR among the plurality of tones, etc. For example, the transmitting device may choose a sequence that has a highest amount of overlap with a subset of N tones having a lowest SNR among the plurality of tones, where N may be a pre-defined number. In other example, the transmitting device may also choose a sequence that has a highest amount of overlap with a subset of N tones having a highest SNR among the plurality of tones, where N is a pre-defined number, etc.

At 1610, the transmitting device transmit data to a receiving device (e.g., a base station, a UE, etc.) in a subset of the plurality of tones that does not include the one or more reserved tones associated with the selected location, such as described in connection with FIG. 15. For example, at 1512, the transmitting device 1502 may transmit data in a subset of the plurality of tones that does not include the one or more PRTs to the receiving device 1504. The transmission of the data may be performed, e.g., by the PRT process component 1746 and/or the transmission component 1734 of the apparatus 1702 in FIG. 17. In one example, the one or more reserved tones may be selected to be ignored by the base station and the data may be transmitted to be decoded by the base station on the subset of the plurality of tones.

In some examples, as shown at 1606, the transmitting device may receive an indication from the receiving device to transmit the plurality of tones comprising the one or more reserved tones and/or to select the location of the one or more reserved tones among the plurality of tones (e.g., using a specified apparatus), e.g., that the transmitting device may transmit the data with tone reservation. The reception of the indication may be performed, e.g., by the reception component 1730 of the apparatus 1702 in FIG. 17. The indication may further indicate which type of tone reservation the transmitting device may use (e.g., Option 1 or Option 2, etc.). The transmitting device may receive the indication in a signaling carried in at least one of the downlink channels, such as RRC, DCI, MAC-CE, etc.

In other examples, as shown at 1608, the transmitting device may transmit an indication to a receiving device (e.g., which may be a base station) indicating the location of the one or more reserved tones (e.g., tones used by the UE for reserved tones), such as described in connection with FIG. 15. The transmission of the indication may be performed, e.g., by the PRT indication component 1744 and/or the transmission component 1734 of the apparatus 1702 in FIG. 17. For example, if the PRT table is used, the transmitting device may indicate to the receiving device, such as via signaling, the specific row of the PRT table (e.g., location of the PRT sequence). If the PRT table is not used, the transmitting device may explicitly indicate or signal the location of reserved tones or data. The indication may be carried in a PUCCH or via a new uplink channel.

Figure 17:
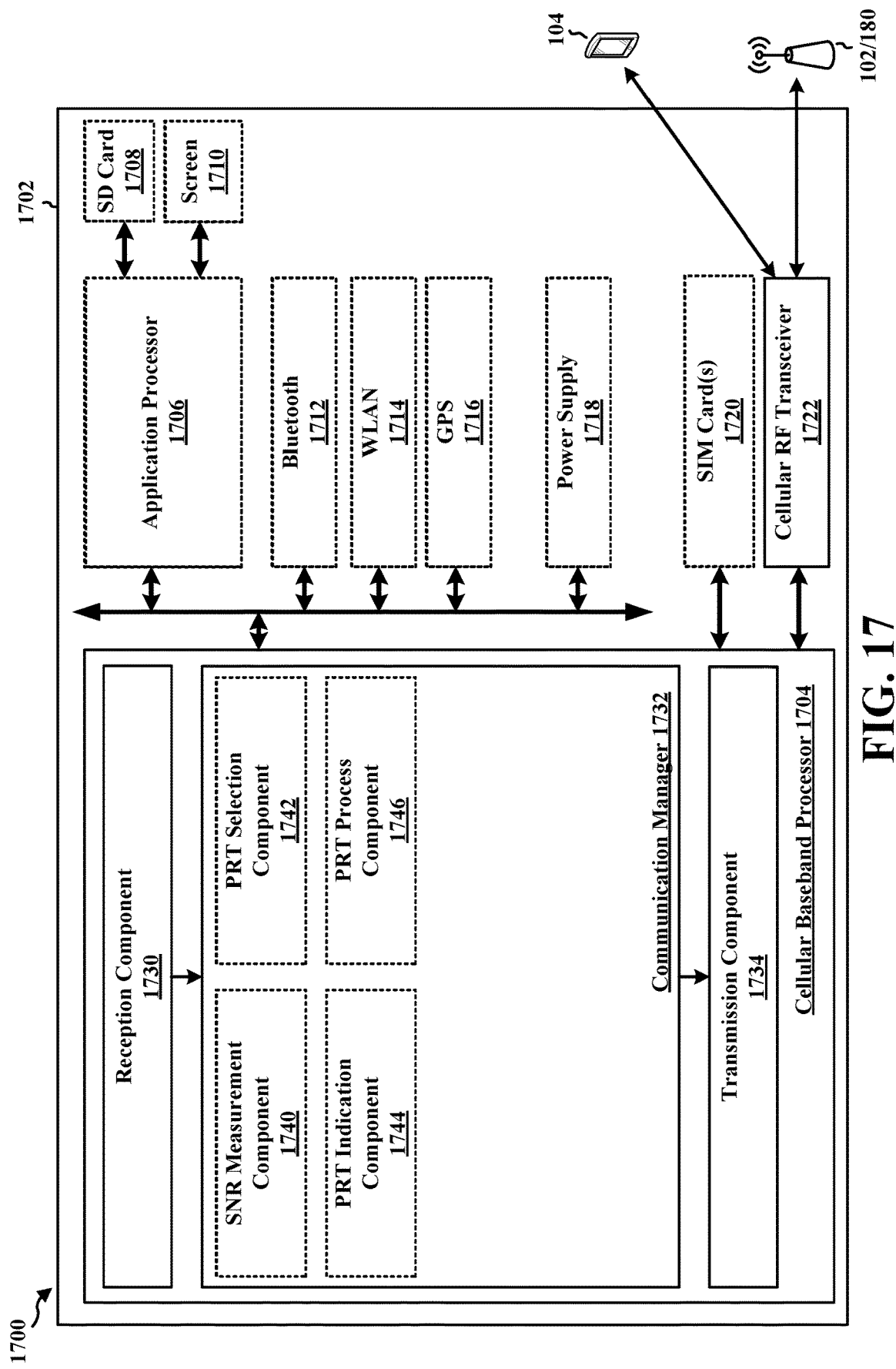
FIG. 17 is a diagram illustrating an example of a hardware implementation for an example apparatus in accordance with various aspects of the present disclosure.

FIG. 17 is a diagram 1700 illustrating an example of a hardware implementation for an apparatus 1702. The apparatus 1702 may be a transmitting device. In some aspects, the apparatus 1702 may be a UE or a component of a UE. In other aspects, the apparatus 1702 may be a base station or a component of a base station. The apparatus 1702 may include a cellular baseband processor 1704 (also referred to as a modem) coupled to a cellular RF transceiver 1722. In some scenarios, the apparatus 1702 may further include one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, and/or a power supply 1718. The cellular baseband processor 1704 communicates through the cellular RF transceiver 1722 with a receiving device, e.g., which may be the UE 104 and/or BS 102/180. The cellular baseband processor 1704 may include a computer-readable medium/memory. The cellular baseband processor 1704 is responsible for general processing, including the execution of software stored on the computer-readable medium/memory. The software, when executed by the cellular baseband processor 1704, causes the cellular baseband processor 1704 to perform the various functions described herein. The computer-readable medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the cellular baseband processor 1704. The cellular baseband processor 1704 may be a component of the UE 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see 350 of FIG. 3) and include the additional modules of the apparatus 1702. In other aspects, the cellular baseband processor 1704 may be a component of the base station 310 or the entire base station 310 and may include the additional modules of the apparatus 1702.

The communication manager 1732 includes an SNR measurement component 1740 that is configured to measure an SNR for a plurality of tones within a frequency resource, e.g., as described in connection with 1602 of FIG. 16. The communication manager 1732 further includes a PRT selection component 1742 that is configured to select a location of one or more reserved tones among a plurality of tones based at least in part on SNR of each of the plurality of tones, e.g., as described in connection with 1604 of FIG. 16. The communication manager 1732 further includes a PRT indication component 1744 that is configured to transmit an indication regarding the availability and/or location of the one or more reserve tones, e.g., as described in connection with 1606 and 1608 of FIG. 16. The communication manager 1732 further includes a PRT process component 1746 that is configured to transmit data to a receiving device in a subset of the plurality of tones that does not include the one or more reserved tones associated with the selected location, e.g., as described in connection with 1610 of FIG. 16.

The apparatus may include additional components that perform each of the blocks of the algorithm in the flowcharts of FIG. 16. As such, each block in the flowcharts of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the cellular baseband processor 1704, may include means for measuring an SNR for a plurality of tones within a frequency resource (e.g., the SNR measurement component 1740). The apparatus 1702 may further include means for selecting a location of one or more reserved tones among a plurality of tones based at least in part on SNR of each of the plurality of tones (e.g., the PRT selection component 1742). The apparatus 1702 may further include means for transmitting data to a receiving device in a subset of the plurality of tones that does not include the one or more reserved tones associated with the selected location (e.g., the PRT process component 1746 and/or the transmission component 1734).

The means may be one or more of the components of the apparatus 1702 configured to perform the functions recited by the means. As described herein, the apparatus 1702 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 18:
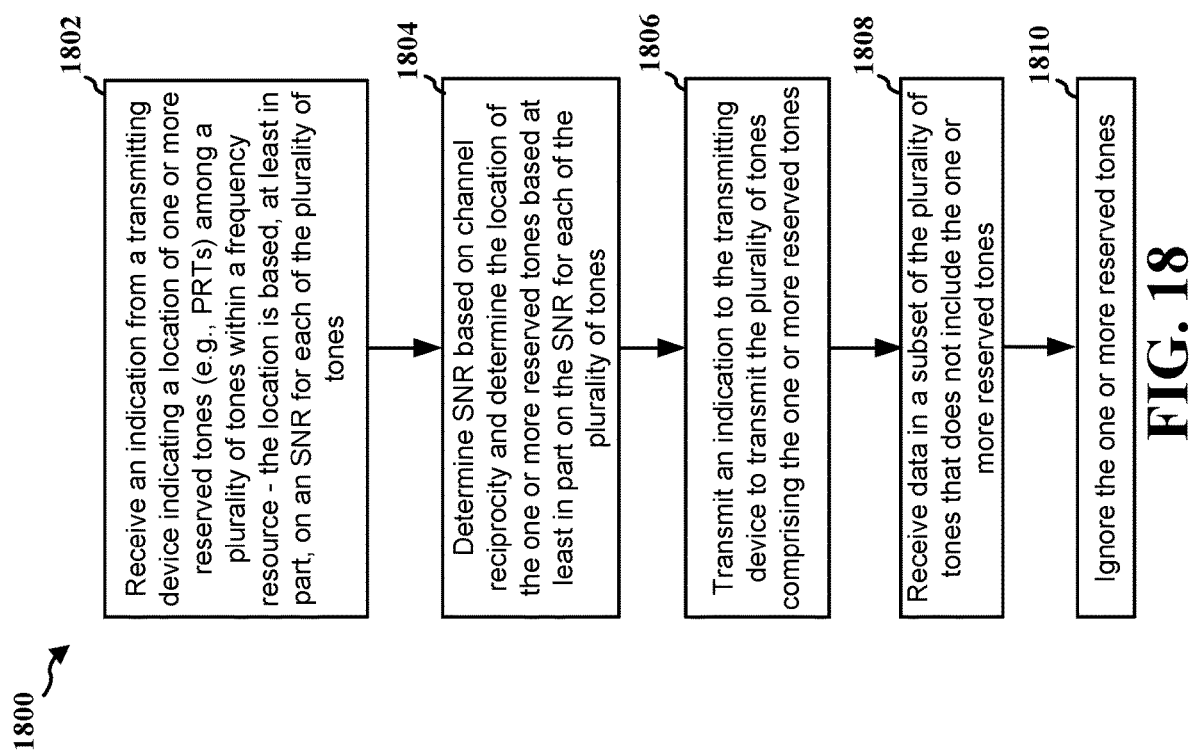
FIG. 18 illustrates a flowchart of a method of wireless communication in accordance with various aspects of the present disclosure.

FIG. 18 illustrates a flowchart 1800 of a method of wireless communication. The method may be performed by a receiving device or a component of a base station (e.g., the receiving device 1504; the apparatus 1902; which may include the memory 376 and which may be the entire base station 310 or a component of the base station 310, such as the TX processor 316, the RX processor 370, and/or the controller/processor 375). In some aspects, the method may be performed by a base station or a component of a base station (e.g., base station 102, 180, 310). In other aspects, the method may be performed by a UE or a component of a UE (e.g., UE 104, 350). The method may enable the receiving device (e.g., a base station) to indicate to a transmitting device (e.g., a UE) whether to send a transmission using tone reservation and which type of tone reservation may be used. The method may also enable the receiving device (e.g., a base station) to determine which tones may be PRTs based on channel reciprocity.

At 1802, the receiving device (e.g., which may be a base station) may receive an indication from a transmitting device (e.g., which may be a UE) indicating a location of one or more reserved tones among a plurality of tones within a frequency resource, where the location may be based, at least in part, on an SNR for each of the plurality of tones, such as described in connection with FIG. 15. For example, at 1510, the receiving device 1504 may receive an indication regarding PRT(s) (e.g., reserved tones) from the transmitting device 1502. The reception of the indication may be performed, e.g., by the PRT indication process component 1940 and/or the reception component 1930 of the apparatus 1902 in FIG. 19. The frequency resource may include one or more resource blocks within an OFDM symbol.

In one example, the location of the one or more reserved tones among the plurality of tones includes tones may have a lower SNR among the plurality of tones. In addition, the location of the one or more reserved tones among the plurality of tones may include satisfying at least one condition in addition to having a lower SNR, such as described in connection with FIG. 12. In other words, the location of the one or more reserved tones among the plurality of tones may include tones that have SNR lower than other tones in the plurality of tones and optionally satisfy at least one condition.

In other example, the location of the one or more reserved tones among the plurality of tones may be based on a sequence (e.g., a PRT sequence) from a table (e.g., a PRT table), where the table may include one or more sequences and each sequence may have a fixed allocation for the one or more reserved tones, such as described in connection with FIG. 13. The allocation for the one or more reserved tones in each sequence may be different from other sequences within the table. The location of the one or more reserved tones among the plurality of tones may be based on a sequence with a lowest average SNR, such as described in connection with FIG. 14. Alternatively, the location of the one or more reserved tones among the plurality of tones may be based on a sequence that has a highest amount of overlap with tones having a lowest SNR among the plurality of tones or based on a sequence that has a lowest amount of overlap with tones having a highest SNR among the plurality of tones. In other words, the location of the one or more reserved tones among the plurality of tones may be based on a sequence that has a highest amount of reserved tones overlapping with a subset of tones that has SNR lower than other tones in the plurality of tones, or based on a sequence that has a lowest amount of reserved tones overlapping with a subset of tones that has SNR higher than other tones in the plurality of tones, etc.

At 1808, after receiving the indication from a transmitting device (e.g., a UE) indicating the location of one or more reserved tones among a plurality of tones within the frequency resource, the receiving device may receive data in a subset of the plurality of tones that does not include the one or more reserved tones, such as described in connection with FIG. 15. For example, at 1512, the receiving device 1504 may receive data in a subset of the plurality of tones that does not include the one or more reserved tones from the transmitting device 1502. The reception of the data may be performed, e.g., by the data reception component 1946 and/or the reception component 1930 of the apparatus 1902 in FIG. 19.

At 1810, after receiving the data in the subset of the plurality of tones that does not include the one or more reserved tones, the receiving device may ignore the one or more reserved tones, and the receiving device may optionally decode the data, such as described in connection with FIG. 15. For example, at 1518, the receiving device 1504 may decode the data and ignore the one or more reserved tones received from the transmitting device 1502. The ignoring of the PRT and/or decoding of the data may be performed, e.g., by the data decoding component 1948 of the apparatus 1902 in FIG. 19. In some examples, the receiving device may ignore the one or more reserved tones actively (e.g., by taking/performing at least one action to ignore the reserved tones). In other examples, the receiving device may ignore the one or more reserved tones passively (e.g., by not performing an action for the one or more reserved tones).

In some examples, for the receiving device to decode the data, the base station may be configured to determine which tones are data and which tones are reserved tones, such that the base station may ignore the reserved tones and decode the data tones. In addition, the receiving device may indicate to the transmitting device whether to send the data with the tone reservation (e.g., reserved tones), and what type of the PRT allocation (e.g., Option 1, Option 2, etc.) the transmitting device may use.

For example, as shown at 1804, the receiving device may determine the SNR based on channel reciprocity and determine the location of the one or more reserved tones based at least in part on the SNR for each of the plurality of tones, such as described in connection with FIG. 15. For example, at 1514, the receiving device 1504 may determine location of PRT(s) based on channel reciprocity. The determination of the SNR may be performed, e.g., by the channel reciprocity component 1942 of the apparatus 1902 in FIG. 19. For example, the receiving device may determine the location of reserved tones based on the channel reciprocity property between the uplink and downlink channels. When channel reciprocity holds, the uplink transmission and the downlink transmission may match exactly. Thus, the channel estimate of the uplink direction at the transmitting device may directly be utilized for link adaptation in the downlink direction and vice versa. Based on the channel estimation, the receiving device may apply or replicate the same reserved tones selection process (e.g., Option 1, Option 2, etc.) as the transmitting device, such that the receiving device may know which tones are selected by the transmitting device for reserved tones.

In some examples, as shown at 1806, the receiving device may transmit an indication to the transmitting device to transmit the plurality of tones comprising the one or more reserved tones. The transmission of the indication may be performed, e.g., by the PRT indication component 1944 and/or the transmission component 1934 of the apparatus 1902 in FIG. 19. In one example, the indication may additionally indicate the type of tone reservation in which the transmitting device is using (e.g., Option 1, Option 2, etc.). If a PRT table or set is used, the indication may further include the PRT sequence to be used by the transmitting device.

Figure 19:
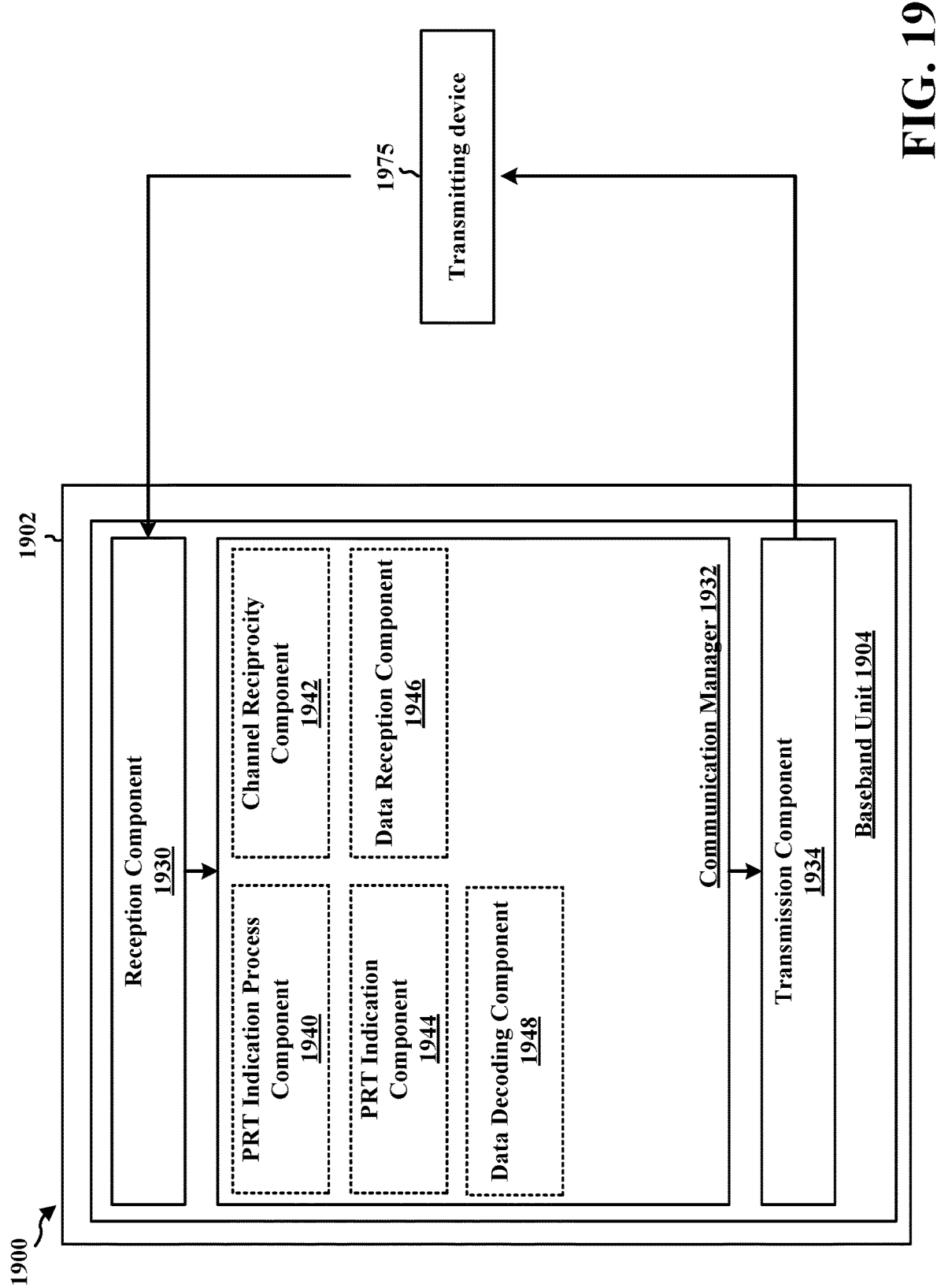
FIG. 19 is a diagram illustrating an example of a hardware implementation for an example apparatus in accordance with various aspects of the present disclosure.

FIG. 19 is a diagram 1900 illustrating an example of a hardware implementation for an apparatus 1902. The apparatus may correspond to the receiving device 1504 described in connection with FIG. 15, for example. In some aspects, the apparatus 1902 may be a or a component of base station. In other aspects, the apparatus may be a UE or a component of a UE. The apparatus may include a baseband unit 1904. The baseband unit 1904 may communicate through a cellular RF transceiver with a transmitting device. In some aspects, the apparatus 1902 may be a base station and the transmitting device 1975 may be a UE, e.g., UE 104. In other aspects, the apparatus 1902 may be a UE and the transmitting device 1975 may be a base station. The baseband unit 1904 may include a computer-readable medium/memory. The baseband unit 1904 is responsible for general processing, including the execution of software stored on the computer-readable medium/memory. The software, when executed by the baseband unit 1904, causes the baseband unit 1904 to perform the various functions described herein. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the BS 310 and may include the memory 376 and/or at least one of the TX processor 316, the RX processor 370, and the controller/processor 375.

The communication manager 1932 includes a PRT indication process component 1940 that receives an indication from a transmitting device indicating a location of one or more reserved tones among a plurality of tones within a frequency resource, where the location is based, at least in part, on an SNR for each of the plurality of tones, e.g., as described in connection with 1802 of FIG. 18. The communication manager 1932 further includes a channel reciprocity component 1942 that determine SNR based on channel reciprocity and determine the location of the one or more reserved tones based at least in part on the SNR for each of the plurality of tones, e.g., as described in connection with 1804 of FIG. 18. The communication manager 1932 further includes a PRT indication component 1944 that transmits an indication to the transmitting device to transmit the plurality of tones comprising the one or more reserved tones, e.g., as described in connection with 1806 of FIG. 18. The communication manager 1932 further includes a data reception component 1946 that receive data in a subset of the plurality of tones that does not include the one or more reserved tones, e.g., as described in connection with 1808 of FIG. 18. The communication manager 1932 further includes a data decoding component 1948 that ignores the one or more reserved tones and/or decodes the data, e.g., as described in connection with 1810 of FIG. 18.

The apparatus may include additional components that perform each of the blocks of the algorithm in the flowcharts of FIG. 18. As such, each block in the flowcharts of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1902 may include a variety of components configured for various functions. In one configuration, the apparatus 1902, and in particular the baseband unit 1904, includes means for means for receiving an indication from a transmitting device indicating a location of one or more PRTs among a plurality of tones within a frequency resource, where the location is based, at least in part, on an SNR for each of the plurality of tones (e.g., the PRT indication process component 1940 and/or the reception component 1930). The apparatus 1902 may further include means for receiving data in a subset of the plurality of tones that does not include the one or more PRTs (e.g., the data reception component 1946 and/or the reception component 1930). The apparatus may further include means for ignoring the PRT (e.g., the data decoding component 1948).

The means may be one or more of the components of the apparatus 1902 configured to perform the functions recited by the means. As described herein, the apparatus 1902 may include the TX Processor 316, the RX Processor 370, and the controller/processor 375. As such, in one configuration, the means may be the TX Processor 316, the RX Processor 370, and the controller/processor 375 configured to perform the functions recited by the means.

The following aspects are illustrative only and may be combined with other aspects or teachings described herein, without limitation.

Aspect 1 is a method of wireless communication at a transmitting device, including: selecting a location of one or more reserved tones among a plurality of tones based at least in part on SNR of each of the plurality of tones; and transmitting data to a receiving device in a subset of the plurality of tones that does not include the one or more reserved tones associated with the selected location.

In aspect 2, the method of aspect 1 further includes measuring an SNR for a plurality of tones within a frequency resource.

In aspect 3, the method of aspect 1 or aspect 2 further includes that the one or more PRTs is selected to be ignored by the receiving device and the data is transmitted to be decoded by the receiving device on the subset of the plurality of tones.

In aspect 4, the method of any of aspects 1-3 further includes that the location of the one or more reserved tones among the plurality of tones includes selecting a subset of tones that has SNR lower than other tones in the plurality of tones.

In aspect 5, the method of any of aspects 1-4 further includes selecting the location of the one or more reserved tones among the plurality of tones includes selecting a subset of tones that has SNR lower than other tones in the plurality of tones and satisfies at least one condition.

In aspect 6, the method of any of aspects 1-5 further includes selecting the location of the one or more reserved tones among the plurality of tones includes choosing a sequence from a table, where the table includes one or more sequences and each sequence has a fixed allocation for the one or more reserved tones over a frequency domain.

In aspect 7, the method of any of aspects 1-6 further includes that the allocation for the one or more reserved tones in each sequence is different from other sequences within the table.

In aspect 8, the method of any of aspects 1-7 further includes that the table is pre-defined in the transmitting device and the receiving device.

In aspect 9, the method of any of aspects 1-8 further includes that choosing a sequence from the table includes choosing a sequence with a lowest average SNR.

In aspect 10, the method of any of aspects 1-9 further includes that choosing a sequence from a table includes choosing the sequence that has a highest amount of reserved tones overlapping with a subset of tones that has SNR lower than other tones in the plurality of tones.

In aspect 11, the method of any of aspects 1-10 further includes that choosing a sequence from a table includes choosing a sequence that has a lowest amount of reserved tones overlapping with a subset of tones that has SNR higher than other tones in the plurality of tones.

In aspect 12, the method of any of aspects 1-11 further includes: transmitting an indication to the receiving device indicating the sequence selected by the transmitting device.

In aspect 13, the method of any of aspects 1-12 further includes: transmitting an indication to the receiving device indicating the location of the one or more reserved tones.

In aspect 14, the method of any of aspects 1-13 further includes that the indication is transmitted in at least one of a DCI, MAC-CE, RRC, PUCCH or a PDCCH.

In aspect 15, the method of any of aspects 1-14 further includes: receiving an indication from the receiving device to transmit the plurality of tones including the one or more reserved tones and to select the location of the one or more reserved tones among the plurality of tones using a specified method.

Aspect 16 is an apparatus for wireless communication at a transmitting device, including: means for measuring an SNR for a plurality of tones within a frequency resource; means for selecting a location of one or more reserved tones among the plurality of tones based at least in part on the SNR of each of the plurality of tones; and means for transmitting data to a receiving device in a subset of the plurality of tones that does not include the one or more reserved tones.

In aspect 17, the apparatus of aspect 16 further includes means to perform the method of any of aspects 2-15.

Aspect 18 is an apparatus for wireless communication at a UE, including: a memory; and at least one processor coupled to the memory, the memory and the at least one processor configured to perform the method of aspects 1-15.

Aspect 19 is a non-transitory computer-readable medium storing computer executable code for wireless communication at a UE, the code when executed by a processor cause the processor to perform the method of any of aspects 1-15.

Aspect 20 is a method of wireless communication at a receiving device, including: receiving an indication from a transmitting device indicating a location of one or more reserved tones among a plurality of tones within a frequency resource, where the location is based, at least in part, on an SNR for each of the plurality of tones; receiving data in a subset of the plurality of tones that does not include the one or more reserved tones; and ignoring the one or more reserved tones.

In aspect 21, the method of aspect 20 further includes that the frequency resource includes one or more resource blocks within an OFDM symbol.

In aspect 22, the method of aspect 20 or aspect 21 further includes that the location of the one or more reserved tones among the plurality of tones includes tones that have SNR lower than other tones in the plurality of tones.

In aspect 23, the method of any of aspects 20-22 further includes that the location of the one or more reserved tones among the plurality of tones includes tones that have SNR lower than other tones in the plurality of tones and satisfy at least one condition.

In aspect 24, the method of any of aspects 20-23 further includes that the location of the one or more reserved tones among the plurality of tones is based on a sequence from a table, where the table includes one or more sequences and each sequence has a fixed allocation for the one or more reserved tones.

In aspect 25, the method of any of aspects 20-24 further includes that the allocation for the one or more reserved tones in each sequence is different from other sequences within the table.

In aspect 26, the method of any of aspects 20-25 further includes that the location of the one or more reserved tones among the plurality of tones is based on a sequence with a lowest average SNR.

In aspect 27, the method of any of aspects 20-26 further includes that the location of the one or more reserved tones among the plurality of tones is based on a sequence that has a highest amount of reserved tones overlapping with a subset of tones that has SNR lower than other tones in the plurality of tones.

In aspect 28, the method of any of aspects 20-27 further includes that the location of the one or more reserved tones among the plurality of tones is based on a sequence that has a lowest amount of reserved tones overlapping with a subset of tones that has SNR higher than other tones in the plurality of tones.

In aspect 29, the method of any of aspects 20-28 further includes that the indication indicates the sequence selected by the transmitting device.

In aspect 30, the method of any of aspects 20-29 further includes that the indication is received in at least one of a DCI, MAC-CE, RRC, PUCCH or a PDCCH.

In aspect 31, the method of any of aspects 20-30 further includes: transmitting an indication to the transmitting to transmit the plurality of tones including the one or more reserved tones and to select the location of the one or more reserved tones among the plurality of tones using a specified method.

In aspect 32, the method of any of aspects 20-31 further includes: determining the SNR based on a channel reciprocity; and determining the location of the one or more reserved tones based at least in part on the SNR for each of the plurality of tones.

Aspect 33 is an apparatus for wireless communication at a receiving device, including: means for receiving an indication from a transmitting device indicating a location of one or more reserved tones among a plurality of tones within a frequency resource, where the location is based, at least in part, on an SNR for each of the plurality of tones; means for receiving data in a subset of the plurality of tones that does not include the one or more reserved tones; and means for ignoring the one or more reserved tones.

In aspect 34, the apparatus of aspect 33 further includes means to perform the method of any of claims 21-32.

Aspect 35 is an apparatus for wireless communication at a receiving device, including: a memory; and at least one processor coupled to the memory, the memory and the at least one processor configured to perform the method of aspects 20-32.

Aspect 36 is a non-transitory computer-readable medium storing computer executable code for wireless communication at a receiving device, the code when executed by a processor cause the processor to perform the method of any of aspects 20-32.

Aspect 37 is yet another method of wireless communication at a transmitting device. The method (like other techniques discussed herein) may include one or more optional actions and/or steps (such as those that follow). For example, the method may include selecting a location of one or more PRT among one or more tones based at least in part on an SNR of the tones. The method may also include measuring an SNR for a plurality of tones within a frequency resource. Further, the method may optionally include transmitting data to a receiving device in a subset of the plurality of tones that does not include the one or more PRTs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if" "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a transmitting device, comprising:
    a memory; and
    at least one processor coupled to the memory and configured to:
        select a location of one or more reserved tones among a plurality of tones based at least in part on signal to noise ratio (SNR) of each of the plurality of tones, wherein to select the location of the one or more reserved tones among the plurality of tones, the at least one processor is configured to either:
            choose a sequence from a table that comprises one or more sequences and each sequence has a fixed allocation for the one or more reserved tones over a frequency domain, or
            receive an indication, from a receiving device, to transmit the plurality of tones comprising the one or more reserved tones, wherein the location of the one or more reserved tones among the plurality of tones is selected using a specified apparatus based on the indication; and
        transmit data to the receiving device in a subset of the plurality of tones that does not include the one or more reserved tones associated with the selected location.

2. The apparatus of claim 1, further comprising a transceiver coupled to the at least one processor, wherein the data is transmitted to the receiving device via the transceiver.

3. The apparatus of claim 1, wherein the at least one processor is further configured to measure the SNR for the plurality of tones within a frequency resource.

4. The apparatus of claim 1, wherein to select the location of the one or more reserved tones among the plurality of tones, the at least one processor is configured to select a subset of tones that has SNR lower than other tones in the plurality of tones.

5. The apparatus of claim 4, wherein to select the location of the one or more reserved tones among the plurality of tones, the at least one processor is configured to select a subset of tones that has SNR lower than other tones in the plurality of tones and satisfies at least one condition.

6. The apparatus of claim 1, wherein the at least one processor is configured to choose the sequence from the table.

7. The apparatus of claim 1, wherein to choose the sequence from the table, the at least one processor is further configured to choose a sequence with a lowest average SNR.

8. The apparatus of claim 1, wherein to choose the sequence from the table, the at least one processor is further configured to choose a sequence that has a highest amount of reserved tones overlapping with a subset of tones that has SNR lower than other tones in the plurality of tones.

9. The apparatus of claim 1, wherein to choose the sequence from the table, the at least one processor is further configured to choose a sequence that has a lowest amount of reserved tones overlapping with a subset of tones that has SNR higher than other tones in the plurality of tones.

10. The apparatus of claim 1, wherein the at least one processor is further configured to:
    transmit a second indication to the receiving device indicating the sequence selected by the transmitting device.

11. The apparatus of claim 1, wherein the at least one processor is further configured to:
    transmit a second indication to the receiving device indicating the location of the one or more reserved tones.

12. The apparatus of claim 11, wherein the second indication is transmitted in at least one of a downlink control information (DCI), medium access control-control element (MAC-CE), radio resource control (RRC), physical uplink control channel (PUCCH) or a physical downlink control channel (PDCCH).

13. The apparatus of claim 1, wherein the at least one processor is configured to:
    receive the indication from the receiving device to transmit the plurality of tones comprising the one or more reserved tones and to select the location of the one or more reserved tones among the plurality of tones using the specified apparatus.

14. A method of wireless communication at a transmitting device, comprising:
    selecting a location of one or more reserved tones among a plurality of tones based at least in part on signal to noise ratio (SNR) of each of the plurality of tones, wherein selecting the location of the one or more reserved tones among the plurality of tones comprises either:
        choosing a sequence from a table that comprises one or more sequences and each sequence has a fixed allocation for the one or more reserved tones over a frequency domain, or
        receiving an indication, from a receiving device, to transmit the plurality of tones comprising the one or more reserved tones, wherein the location of the one or more reserved tones among the plurality of tones is selected using a specified apparatus based on the indication; and
    transmitting data to the receiving device in a subset of the plurality of tones that does not include the one or more reserved tones associated with the selected location.

15. The method of claim 14, wherein selecting the location of the one or more reserved tones among the plurality of tones includes selecting a subset of tones that has SNR lower than other tones in the plurality of tones.

16. The method of claim 14, wherein selecting the location of the one or more reserved tones among the plurality of tones includes selecting a subset of tones that has SNR lower than other tones in the plurality of tones and satisfies at least one condition.

17. The method of claim 14, wherein the sequence that is chosen from the table has a highest amount of reserved tones overlapping with a first subset of tones that has SNR lower than other tones in the plurality of tones, or has a lowest amount of reserved tones overlapping with a second subset of tones that has SNR higher than other tones in the plurality of tones.

18. The method of claim 14, further comprising:
transmitting a second indication to the receiving device indicating the sequence selected by the transmitting device.

19. The method of claim 14, further comprising:
transmitting a second indication to the receiving device indicating the location of the one or more reserved tones.

20. An apparatus for wireless communication at a receiving device, comprising:
a memory; and
at least one processor coupled to the memory and configured to:
receive an indication from a transmitting device indicating a location of one or more reserved tones among a plurality of tones within a frequency resource, wherein the location is based, at least in part, on a signal to noise ratio (SNR) for each of the plurality of tones and based on at least one of:
a sequence from a table, wherein the table comprises one or more sequences and each sequence has a fixed allocation for the one or more reserved tones over a frequency domain, or
transmitting a second indication to the transmitting device to select the location of the one or more reserved tones among the plurality of tones using a specified apparatus;
receive data in a subset of the plurality of tones that does not include the one or more reserved tones; and
ignore the one or more reserved tones.

21. The apparatus of claim 20, further comprising a transceiver coupled to the at least one processor, wherein the indication and the data are received via the transceiver.

22. The apparatus of claim 20, wherein the location of the one or more reserved tones among the plurality of tones includes tones that have SNR lower than other tones in the plurality of tones.

23. The apparatus of claim 20, wherein the location of the one or more reserved tones among the plurality of tones includes tones that have SNR lower than other tones in the plurality of tones and satisfy at least one condition.

24. The apparatus of claim 20, wherein the sequence from the table has a highest amount of reserved tones overlapping with a first subset of tones that has SNR lower than other tones in the plurality of tones, or has a lowest amount of reserved tones overlapping with a second subset of tones that has SNR higher than other tones in the plurality of tones.

25. The apparatus of claim 20, wherein the location of the one or more reserved tones among the plurality of tones is based on a sequence with a lowest average SNR.

26. The apparatus of claim 20, wherein the location of the one or more reserved tones among the plurality of tones is based on a sequence that has a highest amount of reserved tones overlapping with a subset of tones that has SNR lower than other tones in the plurality of tones.

27. The apparatus of claim 20, wherein the location of the one or more reserved tones among the plurality of tones is based on a sequence that has a lowest amount of reserved tones overlapping with a subset of tones that has SNR higher than other tones in the plurality of tones.

28. The apparatus of claim 20, wherein the indication indicates the sequence selected by the transmitting device.

29. The apparatus of claim 20, wherein the indication is received in at least one of a downlink control information (DCI), medium access control-control element (MAC-CE), radio resource control (RRC), physical uplink control channel (PUCCH) or a physical downlink control channel (PDCCH).

30. The apparatus of claim 20, wherein the at least one processor is further configured to:
determine the SNR based on a channel reciprocity; and
determine the location of the one or more reserved tones based at least in part on the SNR for each of the plurality of tones.

31. A method of wireless communication at a receiving device, comprising:
receiving an indication from a transmitting device indicating a location of one or more reserved tones among a plurality of tones within a frequency resource, wherein the location is based, at least in part, on a signal to noise ratio (SNR) for each of the plurality of tones, and based on at least one of:
a sequence from a table, wherein the table comprises one or more sequences and each sequence has a fixed allocation for the one or more reserved tones over a frequency domain, or
transmitting a second indication to the transmitting device to select the location of the one or more reserved tones among the plurality of tones using a specified apparatus;
receiving data in a subset of the plurality of tones that does not include the one or more reserved tones; and
ignoring the one or more reserved tones.

32. The method of claim 31, wherein the location of the one or more reserved tones among the plurality of tones is based on a sequence with a lowest average SNR.

33. The method of claim 32, wherein the indication indicates the sequence selected by the transmitting device.

34. The method of claim 32, wherein the sequence has a highest amount of reserved tones overlapping with a first subset of tones that has SNR lower than other tones in the plurality of tones, or has a lowest amount of reserved tones overlapping with a second subset of tones that has SNR higher than other tones in the plurality of tones.

35. The method of claim 31, further comprising:
determining the SNR based on a channel reciprocity; and
determining the location of the one or more reserved tones based at least in part on the SNR for each of the plurality of tones.

* * * * *